US006243737B1

United States Patent
Flanagan et al.

(10) Patent No.: US 6,243,737 B1
(45) Date of Patent: Jun. 5, 2001

(54) METHOD AND APPARATUS FOR PROVIDING DIRECT TRANSACTION ACCESS TO INFORMATION RESIDING ON A HOST SYSTEM

(75) Inventors: James T. Flanagan, North Bend; Joel L. Rosenberger, Issaquah, both of WA (US)

(73) Assignee: Translink Software, Inc., Bellevue, WA (US)

( * ) Notice: Subject to any disclaimer, the term of this patent is extended or adjusted under 35 U.S.C. 154(b) by 0 days.

(21) Appl. No.: 09/289,786

(22) Filed: Apr. 9, 1999

(51) Int. Cl.[7] ............................. G06F 15/16; G06F 17/30
(52) U.S. Cl. ...................... 709/202; 709/203; 709/217; 709/220; 709/227; 709/229; 709/238; 709/101; 707/10
(58) Field of Search .................... 709/200–204, 709/217–221, 226–229, 236–237, 238, 245–246, 100–101; 707/1, 9–10, 100, 102, 104, 200

(56) References Cited

U.S. PATENT DOCUMENTS

| | | | |
|---|---|---|---|
| 5,634,127 | * | 5/1997 | Cloud et al. ........................ 709/313 |
| 5,678,041 | * | 10/1997 | Baker et al. ....................... 709/229 |
| 5,694,601 | * | 12/1997 | White ................................ 709/101 |
| 5,706,429 | * | 1/1998 | Lai et al. .......................... 709/230 |
| 5,781,739 | * | 7/1998 | Bach et al. ........................ 709/227 |
| 5,802,299 | * | 9/1998 | Logan et al. ...................... 709/218 |
| 5,862,327 | * | 1/1999 | Kwang et al. .................... 709/203 |
| 5,923,846 | * | 7/1999 | Gage et al. ....................... 709/203 |
| 5,951,694 | * | 9/1999 | Choquire et al. ................. 709/203 |
| 5,956,489 | * | 9/1999 | San Andres et al. ............. 709/221 |
| 5,987,426 | * | 11/1999 | Goodwin, III .................... 709/203 |
| 6,058,393 | * | 5/2000 | Meier et al. ...................... 709/100 |

\* cited by examiner

Primary Examiner—Bharat Barot
(74) Attorney, Agent, or Firm—Christensen O'Connor Johnson Kindness PLLC

(57) ABSTRACT

A method, computer-readable medium, and system for providing direct transaction access to information residing on a host system. The system includes a transaction server that routes transactions between the host system and a client device. The transaction server maps client transactions to host transactions using direct transaction access that allows the transaction server to bypass the displays of the host system and to obtain information directly from the host source. Each client transaction is mapped to one or more host transactions. Each host transaction includes inputs and outputs. The host inputs are resolved to addressable references before run-time. The transaction server processes the client transactions concurrently. A graphical user interface is provided that allows a user to create client transactions without writing any programming code. The computer readable-media is loaded on the transaction server without requiring additional software on the host system.

35 Claims, 27 Drawing Sheets

Edit Host Transaction ( DPL_LU0 )

| TRANSACTION | INPUT FIELDS | OUTPUT FIELDS |
|---|---|---|

| NAME | INPUT TYPE | VALUE | FIELD... | FORMAL | SIZE |
|---|---|---|---|---|---|
| TX | DEFAULT | L002 | STRING | EBCDIC | 4 |
| PROGNAM | DEFAULT | LINKPROG | STRING | EBCDIC | 8 |
| TRANID | DEFAULT | L001 | STRING | EBCDIC | 4 |
| FILLER1 | DEFAULT |  | STRING | EBCDIC | 6 |
| LEN-IN | DEFAULT | 00004 | STRING | EBCDIC | 5 |
| LEN-OUT | DEFAULT | 00004 | STRING | EBCDIC | 5 |
| FIRST | REQUIRED |  | STRING | EBCDIC | 2 |

ADD  REMOVE  UPDATE  MOVE UP  MOVE DOWN

FIELD INFORMATION

NAME: TX

SIZE: 4

STREAM OFFSET:

☒ AUTO CALCULATE OFFSETS

FIELD TYPE: STRING

FIELD TYPE: EBCDIC
 ASCII
 EBCDIC
 PACKED DECIMAL
 BCD

INPUT TYPE: DEFAULT

VALUE: L002

CLEAR   OK   CANCEL   APPLY

Edit Host Transaction ( DPL_LU0 )

| TRANSACTION | INPUT FIELDS | OUTPUT FIELDS |

| NAME | FIELD TYPE | FORMAL | SIZE |
|---|---|---|---|
| OUTPUT-TID | STRING | EBCDIC | 4 |
| FILLER5 | STRING | EBCDIC | 3 |
| OUTPUT-LEN | STRING | EBCDIC | 5 |
| FIRST-OUT | STRING | EBCDIC | 2 |
| SECOND-OUT | STRING | EBCDIC | 2 |
| RESULT-OUT | STRING | EBCDIC | 4 |

ADD — REMOVE — UPDATE — MOVE UP — MOVE DOWN

FIELD INFORMATION
NAME: RESULT-OUT
SIZE: 4
STREAM OFFSET:
☑ AUTO CALCULATE OFFSETS

FIELD TYPE: STRING
FIELD TYPE: EBCDIC
  ASCII
  EBCDIC
  PACKED DECIMAL
  BCD

CLEAR  OK  CANCEL  APPLY

New Client Transaction (ClientAMAI)

| TRANSACTION | INPUT FIELDS | OUTPUT FIELDS |

| NAME | FIELD TYPE | FORMAL | FORMAL | SIZE |
|---|---|---|---|---|
| PAYOFF | STRING | ASCII | AMAI.AMRT215 | 14 |
| LINEAMOUNT | STRING | ASCII | AMAI.AMRT132 | 14 |
| CURRENTRATE | STRING | ASCII | AMAI.AMRT001 | 10 |
| PRODUCTTYPE | STRING | ASCII | AMAI.AMRPRODT | 4 |
| AMOUNTAVAILABLE | STRING | ASCII | AMAI.AMRT151 | 14 |
| ORIGINALRATE | STRING | ASCII | AMAI.AMORATE | 10 |
| PRIMARYOFFICER | STRING | ASCII | AMAI.AMCF153 | 5 |

[ ADD ]  [ REMOVE ]  [ UPDATE ]  [ MOVE UP ]  [ MOVE DOWN ]

FIELD INFORMATION

NAME: PAYOFF
SIZE: 14
STREAM OFFSET: 
☒ AUTO CALCULATE OFFSETS

FIELD TYPE: STRING
FIELD TYPE: ASCII / EBCDIC / PACKED DECIMAL / BCD

[ CLEAR ]   [ OK ]  [ CANCEL ]  [ APPLY ]

Fig. 20F

METHOD AND APPARATUS FOR PROVIDING DIRECT TRANSACTION ACCESS TO INFORMATION RESIDING ON A HOST SYSTEM

FIELD OF THE INVENTION

This invention relates generally to methods for retrieving information residing on a host system and, more particularly, for providing direct transaction access to information residing on the host system.

BACKGROUND OF THE INVENTION

Many corporations store a large percentage of their corporate information on large host systems, such as mainframes. The corporations have made substantial investments in creating the information and on maintaining the host systems to provide continuous access to the information at all times. Any changes that affect the host systems are scrutinized to determine whether the change is economical.

With the increasing popularity of the Internet, many corporations are evaluating how best to provide their host-stored corporate information and business logic to new customers residing on the World Wide Web (the Web). The corporations face the challenge of balancing their existing investments in their host systems with their desire to extend their corporate business by using new delivery platforms and the Internet.

There have been various proposed methods for providing information residing on a host system to customers through the Internet, in particular, using the Web. A typical solution involves adding new software code on the host system that interfaces with Web-based users. One disadvantage to this approach is that a skilled programming expert must first write the software code. The software code is then loaded and tested on the host system. During this process, the host system is taken off-line and is unavailable for processing corporate transactions. In addition, any maintenance of the newly created software code also requires the host system to be taken off-line. Taking the host system off-line in a business that depends heavily on the information results in a huge financial loss.

Another approach is to use component object modules (COM). For this approach, the client application provides the presentation layer for the application or the data. The client application may be an Active Server Page, a Visual Basic (VB) application, or a Microsoft Office application that can call a Microsoft Transaction Server (MTS) component. The MTS component is a COM object that provides the functionality for the mainframe transaction process (TP) as a COM interface method. Therefore, the MTS component contains the transaction logic for processing the component. A disadvantage of this approach is that the host code must be accessible at the client and the mappings are one-to-one.

Another approach uses a terminal emulator to access corporate information stored on a host system. The terminal emulator navigates the host displays to obtain the desired information. A disadvantage of this approach is that navigating through each of the displays on the host system is very slow. Another disadvantage is that each Web-based user that wants access to the information on the host system must have a logical terminal. A logical terminal requires the host system to allocate resources (i.e., memory) for the logic terminal. Because this approach requires resources from the host system, this approach only provides limited scalability for additional Web-based users. Typically, approximately 250 users have access to the corporate information at one time. The number of Web-based users supported, of course, depends on the memory resources of the host system.

Given the shortcomings of these approaches, there is a need for a method of providing access to information residing on a host system that does not require additional software programming and testing on the host system, does not require additional memory resources of the host system and that is scaleable to offer access to many Web-based users.

SUMMARY OF THE INVENTION

In accordance with this invention, a method, a computer-readable medium, and a system for providing direct transaction access to information residing on a host system are provided. A client transaction comprising one or more input fields and one or more output fields is created. For each client transaction, the client transaction is mapped to one or more host transactions. Each host transaction comprises one or more host input fields and one or more host output fields. The host input fields are resolved to addressable references according to the mapping. The host transactions for a particular client transaction are submitted to a host system for processing concurrently with other host transactions for other client transactions. Once all the outputs from the host transactions for the particular client transaction are received, the outputs are forwarded to a client device.

A system and computer-readable medium encoded with certain program instructions, both of which generally function as described above, represent further aspects of the present invention.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 20A–20G are a series of windows generated by a graphical user interface module which are used to map client to host transactions.

DETAILED DESCRIPTION OF THE PREFERRED EMBODIMENT

As will be better understood from the following description, the present invention retrieves information residing on a host system and provides that information to a client computer or other device without adversely impacting the host system. As will be described in more detail below, the present invention routes transactions between the host system and a client device (e.g., a Web-based client computer) in real-time. A transaction is an exchange of information between a client device and the host system that accomplishes a particular action or result, e.g., the entry of a customer's deposit by the client computer resulting in the updating of a customer's balance by the host system. The present invention provides direct access to host-stored data and eliminates the need to navigate the displays of the host system. Thus, the desired information is obtained in a more timely manner, without requiring additional memory from the host system, and without requiring additional application software to be loaded and tested on the host system.

Figure 1:
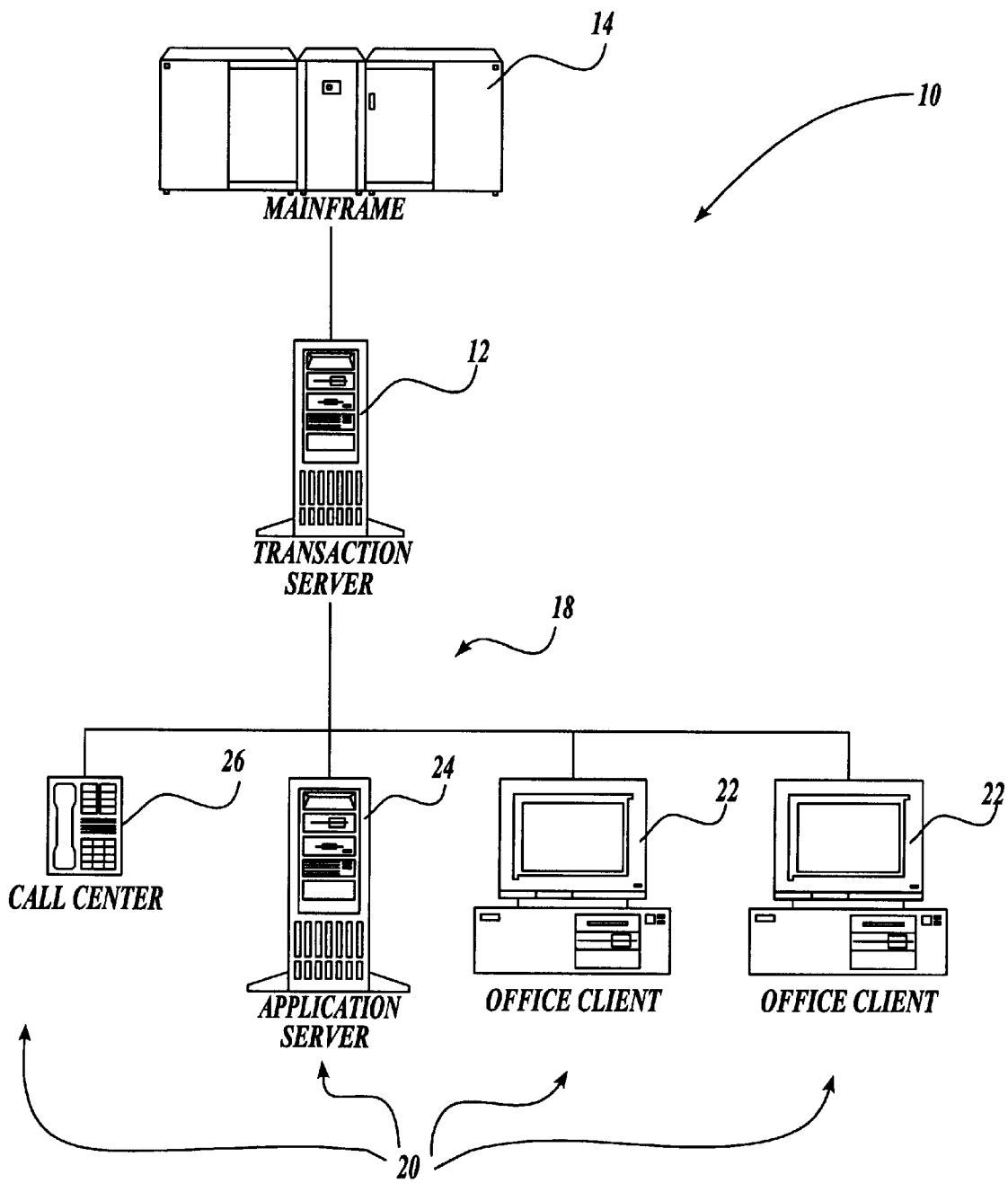
FIG. 1 is a pictorial diagram of a host system/client computer environment in which the present invention may be implemented.

FIG. 1 and the following discussion are intended to provide a brief, general description of a suitable computing environment 10 in which the present invention may be implemented. The computing environment 10 includes a host system 14 coupled to a transaction server 12. The transaction server 12 is also coupled to a plurality of computer and electronic devices (22, 24 and 26) interconnected to form a Local Area Network (LAN) 18. In the actual embodiment of the present invention shown in FIG. 1, the host system 14 is depicted as a mainframe computer. As those of ordinary skill in the art will appreciate, the mainframe computer may implement any number of programs and/or operating environments for use by the other computer devices forming the LAN 18 depicted in FIG. 1. For example, the mainframe computer may implement a Customer Information Control System (CICS) that enables transactions entered at remote computers to be processed concurrently by user-written application programs; or an Information Management System (IMS) that manages the storage and retrieval of data in complex databases and networks. Although FIG. 1 depicts only one mainframe computer, it will be appreciated that the computing environment 10 in which the present invention is implemented may include a plurality of host systems 14.

As noted above, the host system 14 is coupled via a communications link, i.e., either directly or via some other network connection, to the transaction server 12 which contains a direct transaction mapping program 38 that routes client transactions generated by the various computers and electronic devices (22, 24 and 26) to the host system 14 in real-time. In the embodiment of the present invention shown in FIG. 1, the LAN 18 is a bus network interconnecting various client computers, such as office clients 22; servers, such as application server 24; and other electronic devices, such as call center 26. As will be appreciated by those familiar with network computer systems, any number or type of electronic device and/or computer system could be connected to the LAN 18, and thus the transaction server 12, if equipped with the necessary hardware. Such electronic devices and computer systems may include workstations, personal computers, laptop computers, personal digital assistants, automatic teller machines, telephones, point-of-sale computer systems, Web servers, electronic catalog servers, etc. For purposes of the present discussion, however, all such electronic devices and computer systems will be referred to generally as "client devices 20."

The LAN 18 may be formed of various coupling media such as glass or plastic fiber-optic cables, coaxial cables, twisted wire pair cables, ribbon cables, etc. In addition, one of ordinary skilll in the art will appreciate that the coupling medium can also include a radio frequency coupling media or other coupling media. In view of the availability of preinstalled wiring in current commercial environments, twisted wire pair copper cables are used to form the LAN 18 in the actual embodiment of the present invention described herein.

It will further be appreciated by those of ordinary skilll in the computer network arts that if the LAN 18 includes a gateway or router, the LAN 18 may be interconnected with yet other local and wide area networks so as to join the Internet. As those with ordinary skill in the art well know, the capitalized term "Internet" refers to the collection of networks and routers that use the Transmission Control Protocol/Internet Protocol (TCP/IP) to communicate with one another. It will also be appreciated that the LAN 18 may be implemented within a single company or organization as an intranet. An intranet usually employs applications associated with the Internet, such as Web pages, Web browsers, FTP sites, email, etc. However, access to these applications is limited only to those within the company or organization. Finally, one of ordinary skill in the art will recognize that the LAN 18 if implemented as an intranet, may also be extended using web technology to outside participants as an extranet. An extranet allows outside participants limited access to the intranet.

Figure 2:
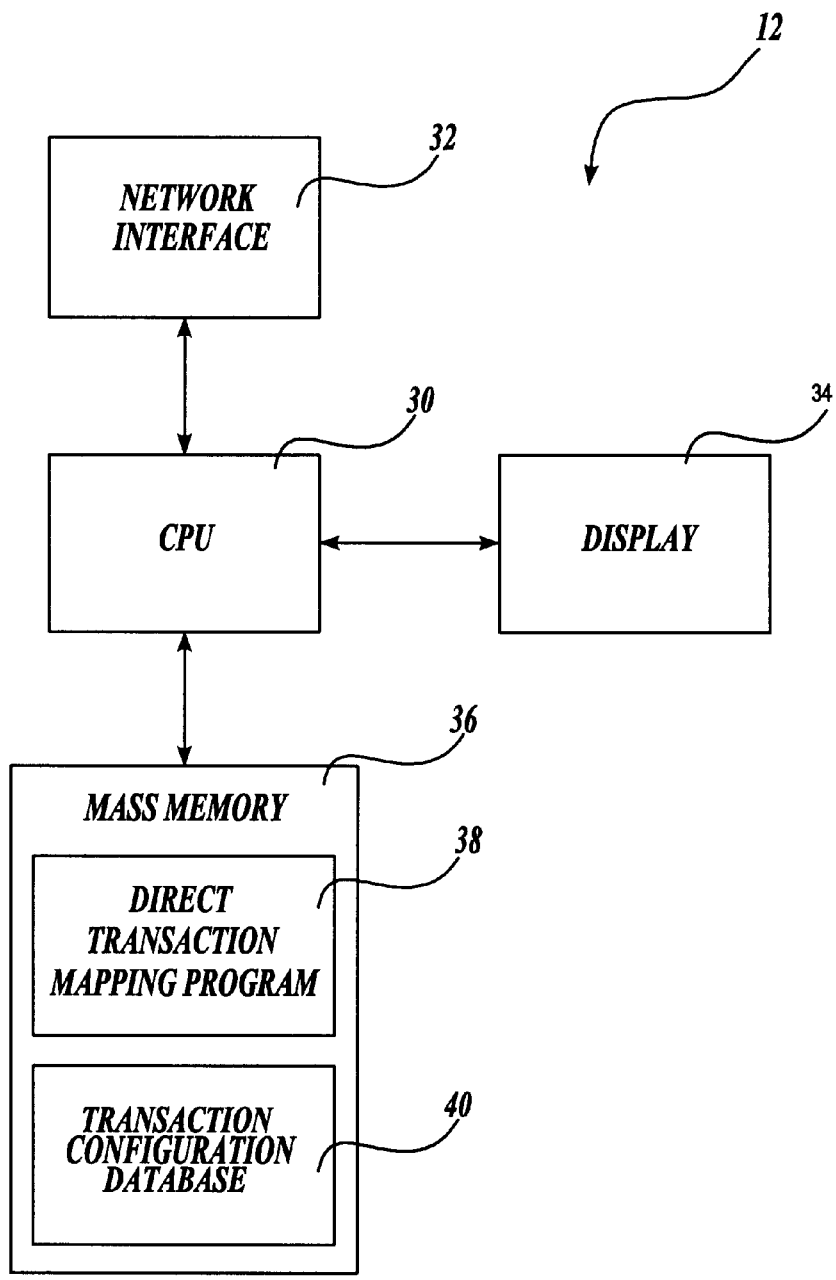
FIG. 2 is a block diagram of the several components of a transaction server shown in FIG. 1 that is used to implement a direct transaction mapping program for providing client computers direct transaction access to information residing on a host system in accordance with the present invention.

Now that the computing environment 10 in which the present invention may be implemented, has been described, the transaction server 12 will be described in more detail. FIG. 2 depicts several of the key components of the transaction server 12. It will be appreciated by those of ordinary skill in the art that transaction server 12 includes many more components than those shown in FIG. 2. However, it is not necessary that all of these generally conventional components be shown in order to disclose an illustrative embodiment for practicing the present invention. As shown in FIG. 2, the transaction server 12 includes a network interface 32 for connecting the transaction server 12 to the client devices 20 and the host system 14. Those of ordinary skill in the art will appreciate that network interface 32 includes the necessary circuitry for connecting the transaction server 12 to the LAN 18 and to the host system 14 (either directly or perhaps through another intra or internetwork connection). In addition, it will be appreciated that the network interface 32 is also constructed for use with the TCP/IP protocol and a particular type of coupling medium.

The transaction server 12 also includes a central processing unit (CPU) 30, a display 34 and a mass memory 36. The mass memory 36 may include a random access memory (RAM), a read only memory (ROM), and a permanent mass storage device, such as a hard disk drive, tape drive, optical drive, floppy disk drive, or combination thereof The mass memory 36 stores the program code and data necessary for mapping client to host transactions so as to obtain host stored data in accordance with the present invention. More specifically, the mass memory stores a direct transaction mapping program 38 and a transaction configuration database 40 that provide direct transaction access to host system information.

Figure 3:
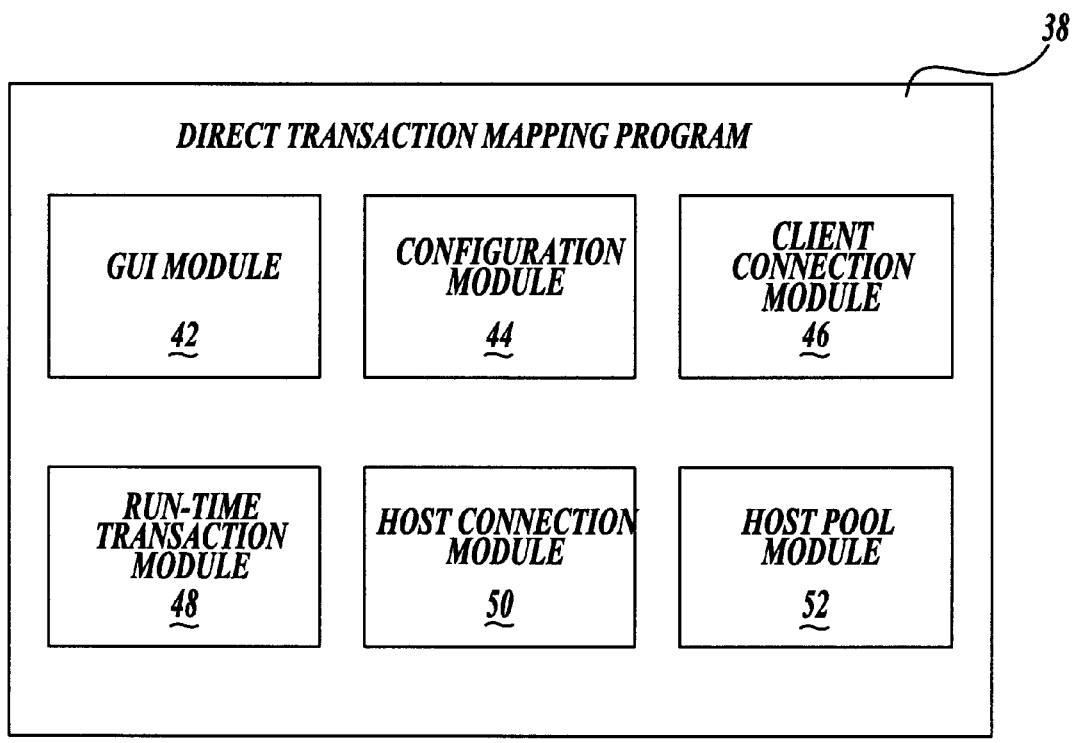
FIG. 3 is a block diagram of a plurality of modules comprising the direct transaction mapping program shown in FIG. 2 implemented by the transaction server.

FIG. 3 is a block diagram illustrating the modules comprising the direct transaction mapping program 38. The direct transaction mapping program 38 includes a graphical user interface (GUI) module 42, a configuration module 44, a client connection module 46, a run-time transaction module 48, a host connection module 50, and a host pool module 52. These modules may be stored on a computer-readable medium and loaded into mass memory 36 of the transaction server 12 using a drive mechanism associated with the computer-readable medium, such as a floppy or optical (i.e., CD-ROM) drive. The interaction between these modules is best illustrated with reference to FIG. 4.

Figure 4:
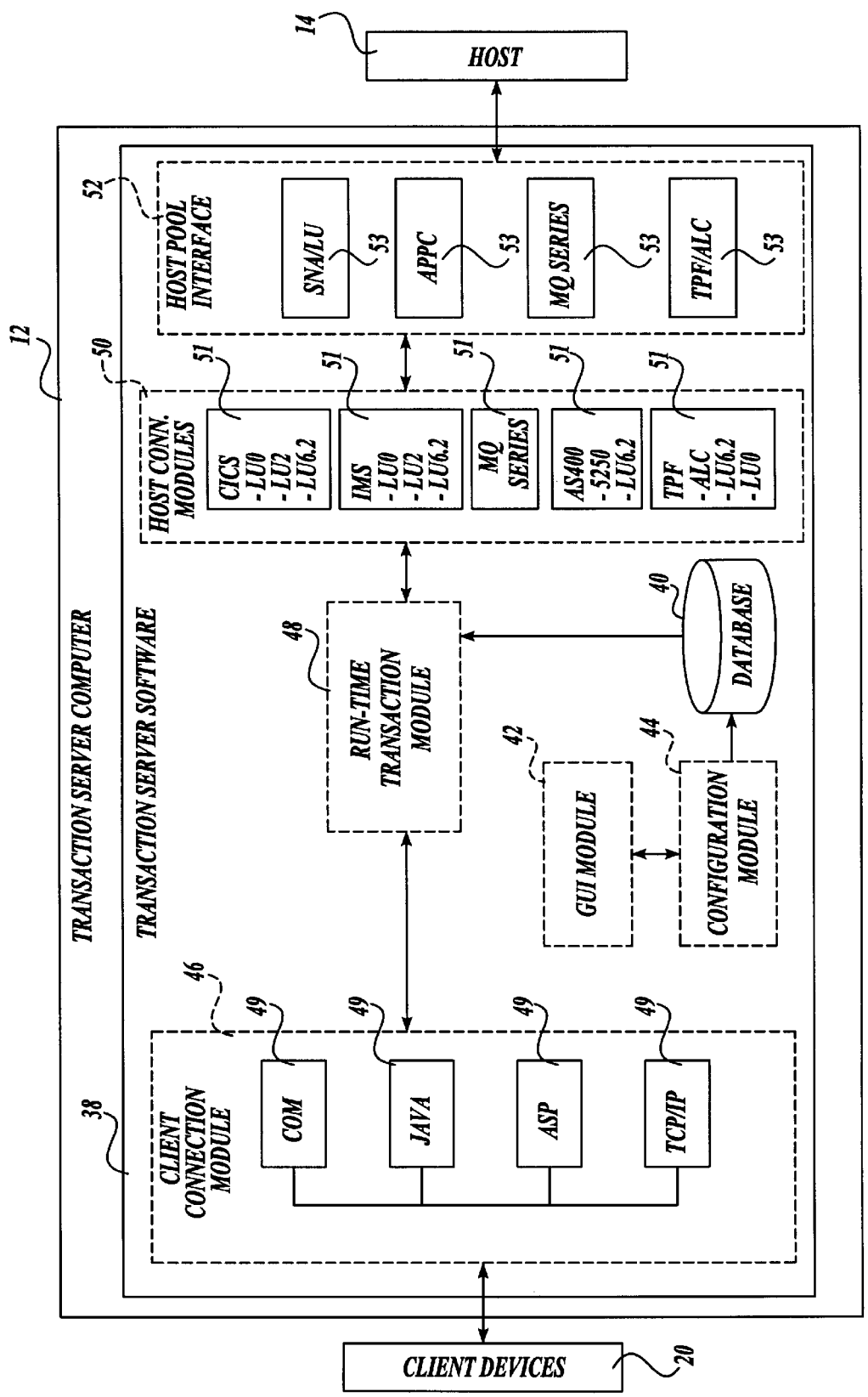
FIG. 4 is an operational block diagram of the direct transaction mapping program shown in FIG. 3.

In the actual embodiment shown in FIG. 4, the GUI module 42 contains instructions that provide an administrator using the transaction server 12 with graphical displays or windows by which the administrator enters or selects data and instructions that are used by the configuration module 44. The configuration module 44 uses the data and instructions entered by the administrator to preconfigure the desired client to host transaction mappings. As will be described in more detail below, these mappings are then used to obtain data from the host system 14 in response to requests for such data made by the client devices 20.

The client to host transaction mappings generated during the configuration process are stored in the transaction configuration database 40 residing in mass memory 36 for access by run-time transaction module 48. The run-time transaction module 48 loads the client to host transaction mappings from the transaction configuration database 40 in response to a client transaction request from a client device 20. The run-time transaction module 48 then submits the host transactions mapped to the requested client transaction to the host system 14 so that the host system 14 may provide the data required by the submitted host transactions.

In order to receive client transaction requests from the client devices 20, the run-time transaction module 48 must interface with the client connection module 46. The client connection module 46 contains instructions that provide a standard interface to different types of client devices 20 by using a transaction message protocol (TxMsg) that describes the format of the data messages sent between the client device 20 and the client connection module 46. As one skilled in the art will appreciate, the format of the message may be implemented in a variety of ways, as long as both the client connection module 46 and the client devices 20 use the same format. In one actual embodiment of the present invention, TxMsg is implemented on top of any existing protocol, such as TCP/IP.

Figure 21:
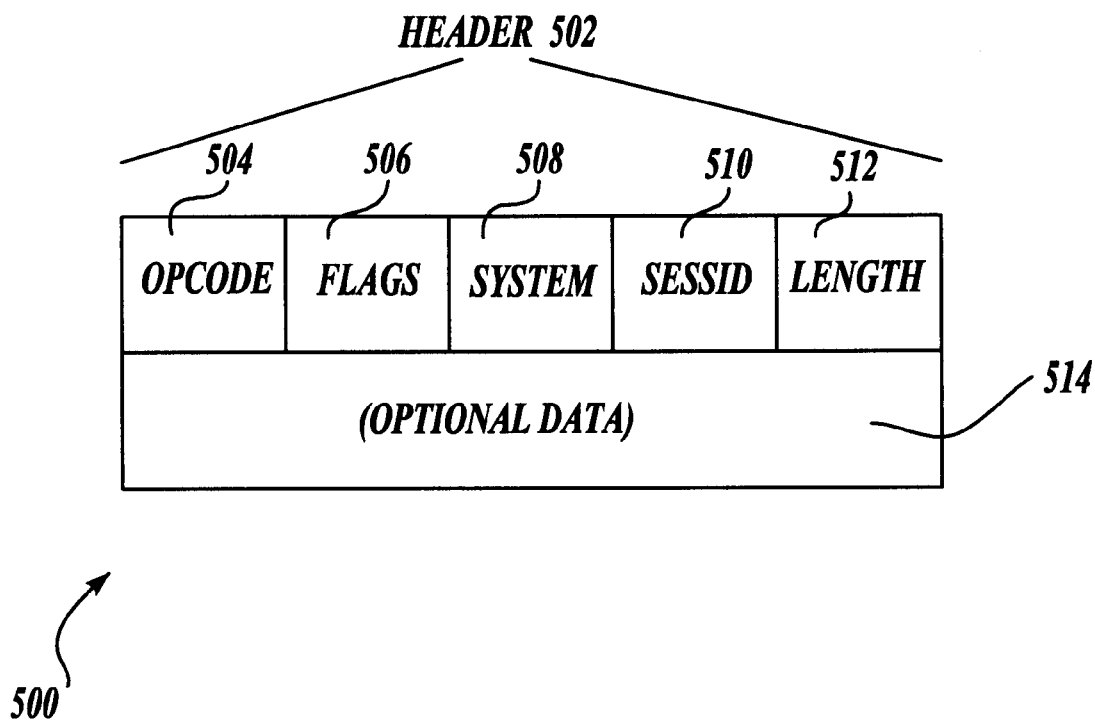
FIG. 21 is a diagram illustrating a transaction message format.

A TxMsg includes a header and an optional data portion. As shown in FIG. 21, the header 502 of the TxMsg 500 includes an opcode field 504, a flags field 506, a system field 508, a sessid field 510, and a length field 512. The opcode field 504 stores a parameter that specifies the type of message. The types of messages supported may be administrator defined codes that indicate the client transaction or may be system codes, such as codes indicating a request to get a transaction identifier. The flags field 506 stores a parameter that defines characteristics of the TxMsg 500, such as an error. The system field 508 typically stores a parameter indicating a tag that correlates the client transaction with a session on the host system 14. This tag may be returned from the host system 14 so that subsequent client transaction requests may use the same session. The sessid field 510 stores a parameter that specifies a host pool identifier or session identifier of the host transaction request. This parameter is used on certain host system calls. The length field 512 stores a parameter indicating the size of the optional data portion 514. For messages that do not include the optional data portion 514, the parameter is zero.

If a new type of client device 20 desires to access information on the host system 14, a new client connection interface module 49 is added to the client connection module 46 to support the new type of client device 20. Because the additional client connection interface module 49 only adds software code to the client connection module 46, the other direct transaction mapping program modules are not impacted when a new type of client device 20 is supported. This provides an efficient approach to supporting new client devices 20. Typical client interface modules 49 include a Component Object Module (COM), JAVA, an Active Server Page (ASP), and a TCP/IP socket interface. As one skilled in the art will appreciate, other client connection interface modules 49 may be added without departing from the scope of the present invention. Since any number and variety of client connection interface modules 49 may be added to the client connection module 46 and the content and programming of such modules may be readily done by one skilled in the art, a further description of these interface modules is not required in order to disclose an illustrative embodiment for practicing the present invention.

In order to submit host transactions to the host system 14 and receive data in return, the run-time transaction module 48 also interfaces with the host connection module 50 through procedure calls and other standard methods well-known in the art of programming. The host connection module 50 includes one or more host connector interface modules 51 that provide a standard interface to the run-time transaction module 48. As shown, typical host connector interface modules 51 include support for various transaction processing systems, e.g., Customer Information Control System (CICS), Information Magement System (IMS), and Transaction Processing Facility (TPF), through typical terminal interfaces (3270, 5250, ALC) or a direct transaction interface (LU0, LU6.2, MQ Series).

The host connector module 50 also interfaces to the host pool module 52, which in turn, interfaces with the host system 14 to provide a memory area in the host system 14 for transaction processing. The host pool module 52 includes one or more host pool interfaces 53, such as a Systems Network Architecture (SNA)/Logic Unit (LU) coupler, an Advanced Program-to-Program Communication (APPC), a MQ Series and a Transaction Processing Facility (TPF)/ALC coupler. The host pool interface modules 53 provide interfaces that are dependent on the type of communication link between the host system 14 and the transaction server 12.

If another type of host system 14 desires to connect to the transaction server 12, a new host pool interface module 53 and corresponding host connector module 51 (if necessary) supporting the new type of host system and its communication link to the transaction server 12 are added to the host pool module 52 and host connector module 50, respectively. Because the additional host pool interface module 53 only adds code to the host pool module 52, the other direct transaction mapping program modules are not impacted. This provides an efficient approach to supporting new host systems. Since any number and variety of host pool interface modules 53 may be added to the host pool module 52 and the content and programming of such modules may be readily accomplished by one skilled in the art, a further description of these interface modules is not required in order to disclose an illustrative embodiment for practicing the present invention.

Figure 5:
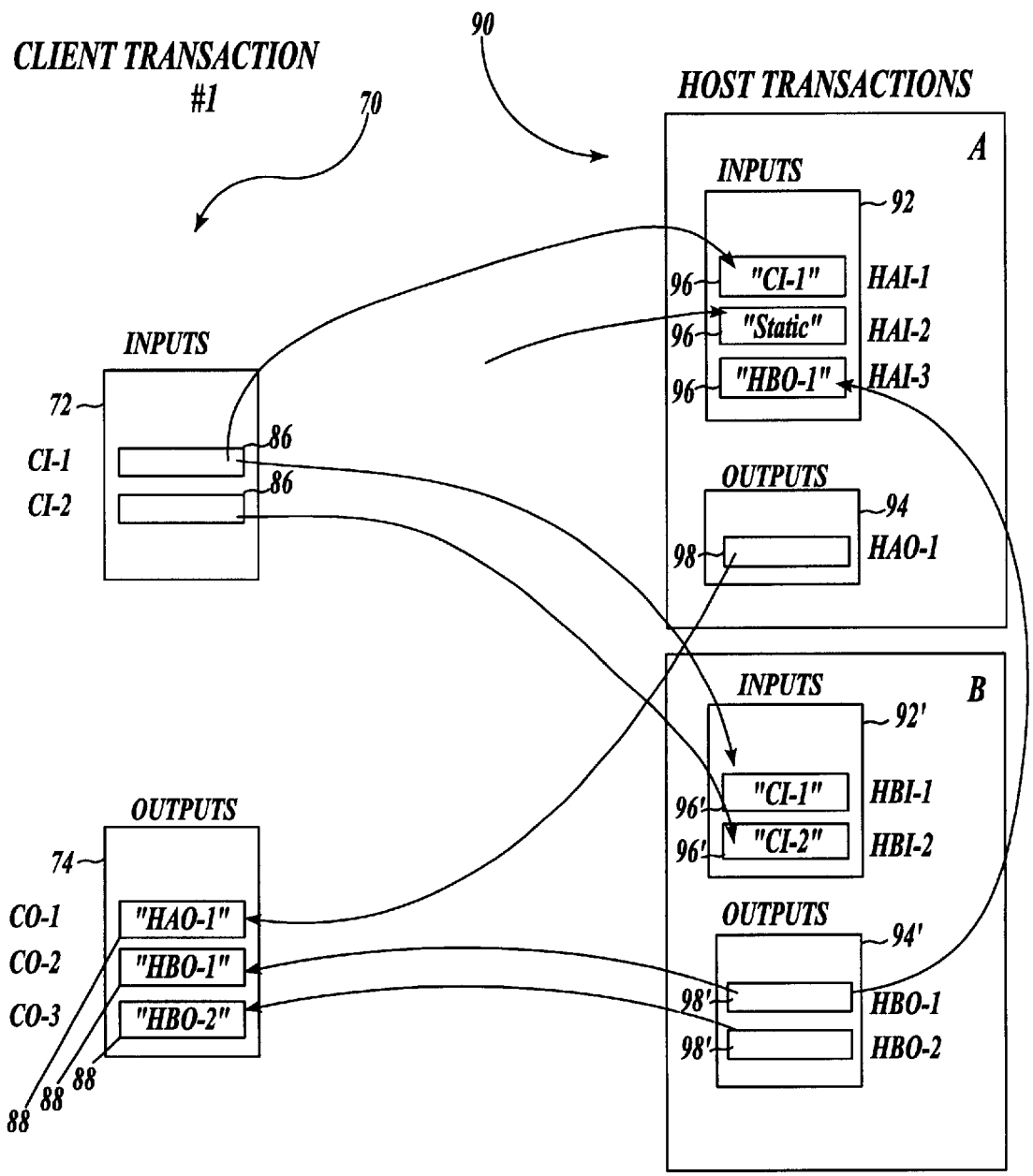
FIG. 5 is a diagram illustrating a sample client to host transaction mapping.

As mentioned earlier, the direct transaction mapping program 38 enables an administrator to map a client transaction directly to one or more host transactions. Therefore, the present invention does not require the navigation through host screens during run-time. FIG. 5 is a diagram illustrating a client transaction 70 mapping to host transactions 90 according to the present invention. The configuration module 44 used to map the client transaction 70 will be described in more detail below with reference to FIGS. 6–11. As an overview, the client transaction 70 includes client inputs 72 and a client outputs 74. The client inputs 72 include one or more client input (CI) fields 86 and the client outputs 74 include one or more client output (CO) fields 88. In the example provided in FIG. 5, client transaction 1 has two client input fields (CI-1 and CI-2) and three client output fields (CO-1, CO-2, and CO-3). However, those of ordinary skill in the art will appreciate that a client transaction 70 may have any member of input and output fields.

A host transaction 90, on the other hand, includes host inputs 92 and host outputs 94. The host inputs 92 include one or more host input fields 96 and the host outputs 94 include one or more host output fields 98. In the example provided, there are two host transactions: host transaction A and host transaction B. Host transaction A has three host input fields (HAI-1, HAI-2, and HAI-3) and one host output field (HAO-1). The second host transaction, host transaction B, has two host input fields (HBI-1 and HBI-2) and two host output fields (HBO-1 and HBO-2). Again, those of ordinary skill in the art will appreciate that a host transaction 90 may include any number of input and output fields.

The client output fields 88 of the client transaction 70 store the information that the client device 20 desires to obtain from the host system 14. Using the client output fields 88, the administrator of the transaction server 12 may determine which host transactions 90 must be mapped to the client transaction 70 in order to achieve the desired results. For example, as shown in FIG. 5, the client output field labeled CO-1 of client transaction 1 desires information obtainable from host transaction A. The client output fields CO-2 and CO-3 desire information obtainable from the host transaction B. Therefore, both host transaction A and host transaction B must be mapped to client transaction 1. The mapping of client transactions by the configuration module 44 will be discussed in more detail now with reference to FIGS. 6–11.

Figure 6:
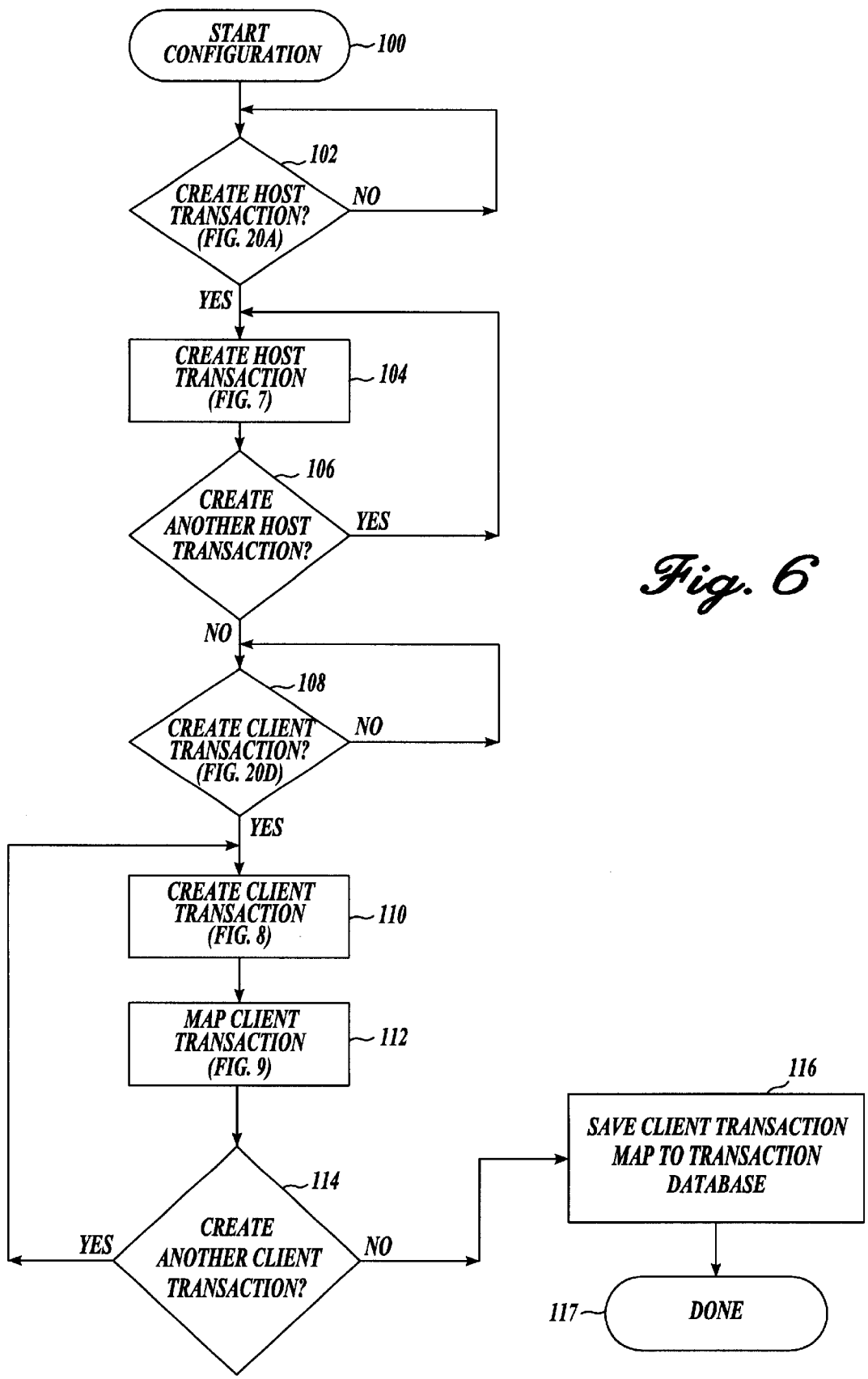
FIG. 6 is a flow diagram illustrating an overview of the logic used by a configuration module of the direct transaction mapping program to enable an administrator of the transaction server 12 to configure a client to host transaction mapping such as that shown in FIG. 5.

FIG. 6 is a flow diagram illustrating an overview of the logic implemented by the configuration module 44 of the present invention that allows the administrator of the transaction server 12 to configure client to host transaction mappings. FIGS. 20A–G illustrate the windows generated by the GUI module 42 of the direct transaction mapping program 38 which are used by the administrator to configure the client to host transaction mappings in accordance with the configuration module 44. As one of ordinary skill in the art will appreciate, a text based user interface or other interface may also be used without departing from the scope of the present invention.

Figure 20A:
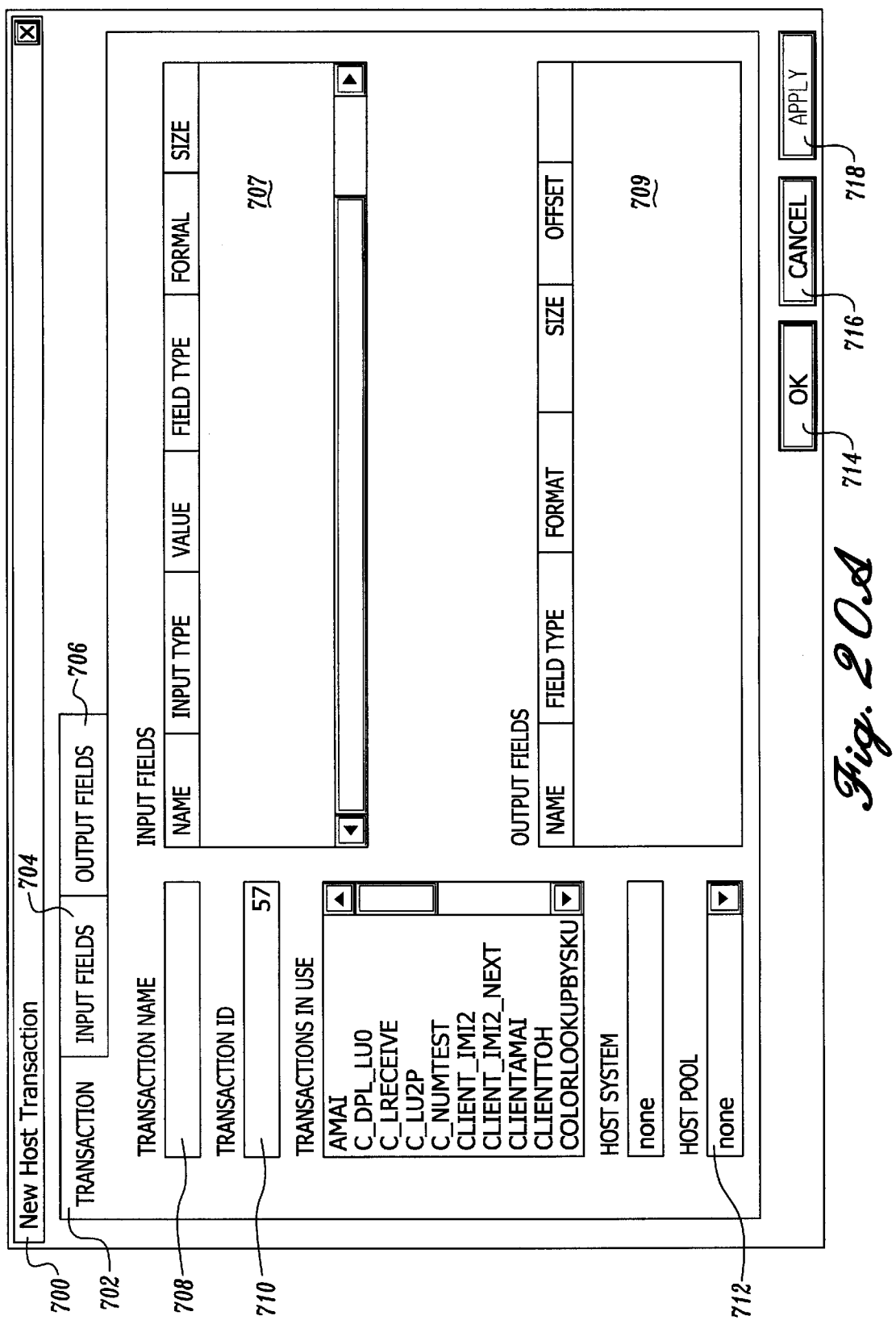
Figure 20D:
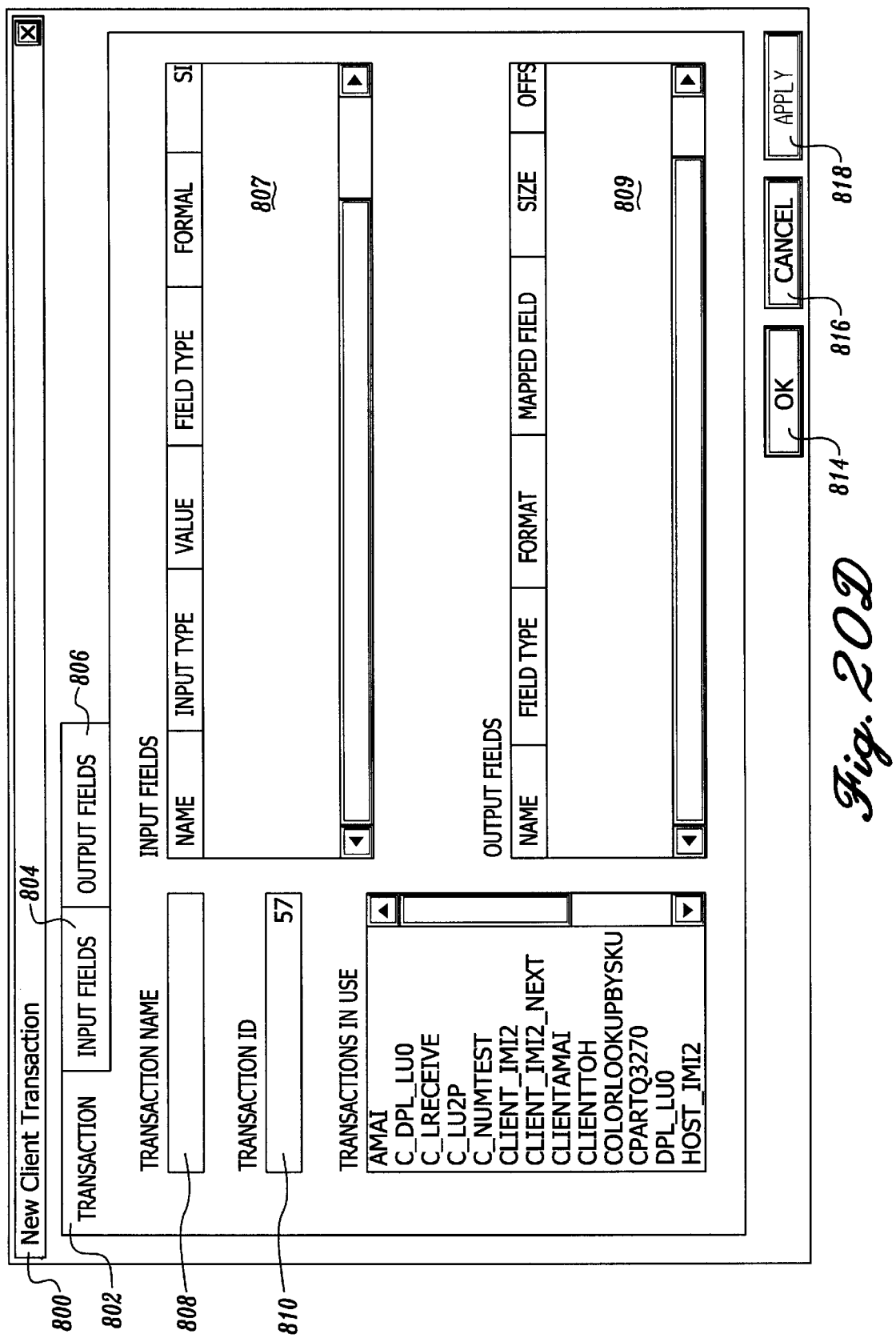

The logic begins in FIG. 6 in a block 100 and proceeds to a decision block 102, where it determines if the administrator has opted to create a host transaction 90 by selecting a transaction tab 702 in a new host transaction window 700 generated by the GUI 42 as shown in FIG. 20A The GUI 42 generates a New Host Transaction window 700 on the display 34 of the transaction server 12 so that the administrator can easily navigate to the necessary fields. There are three tabs to aid in the navigation of the New Host Transaction window 700: a transaction tab 702, a host input fields tab 704, and a host output fields tab 706. As shown, transaction tab 702 provides fields for entering data into a transaction name field 708, a transaction I.D. field 710, and a host pool field 712. An input field window 707 and an output field window 709 show data that has been entered through a different graphical display. The New Host Transaction window 700 also provides a standard OK button 714 and a cancel button 716. In addition, an apply button 718 is provided for future enhancements, but currently is unused. It will be appreciated that at least one host transaction 90 must exist so that a client transaction 70 can map to it. Therefore, if the result of decision block 102 in FIG. 6 is negative, the decision block is merely repeated until the administrator chooses to create a host transaction 90. However if the result of decision block 102 is positive, the logic proceeds to block 104 where a host transaction 90 is created using the transaction name (field 708) and transaction ID (field 710) entered by the administrator in the new host transaction window 700. The creation of the host transaction 90 using this data will be described in more detail with reference to FIGS. 7, 20B and 20C.

Once a host transaction 90 is created, the logic proceeds to a decision block 106 to determine if the administrator has opted to create another host transaction 90. If so, the logic returns to block 104 where another host transaction 90 is created as desired by the administrator. Blocks 104 and 106 are then repeated until all the host transactions 90 desired by the administrator have been created. It follows that multiple host transactions 90 may be created, or if desired by the administrator, as few as one. As one of ordinary skill in the art will appreciate, each host system 14 connected to the transaction server 12 contains access to certain information. The information determines which host transactions 90 are available. Typically, it is desirable for the administrator to create all the host transactions 90 that are available from the host systems 14 connected to the transaction server 12 before creating a client transaction 70. By proceeding in this manner, the administrator is knowledgeable of all the available host transactions 90 when creating client transactions 70.

Returning to decision block 106, if it is determined that another host transaction is not to be created at this time, the logic proceeds to decision block 108. In decision block 108, the logic determines if the administrator has opted to create a client transaction 70 to which the host transaction(s) 90 just created should be mapped. More specifically, in one actual embodiment shown in FIG. 20D, it is determined if the administrator has selected a transaction tab 802 in a new client transaction window 800 generated by the GUI 42. The GUI generates the New Client Transaction window 800 on the display 34 of the transaction server 12 so that the administrator can easily navigate the necessary fields. There are three tabs to aid in the navigation of the New Client Transaction window 800: a client transaction tab 802, an client input fields tab 804, and client output fields tab 806. As shown, client transaction tab 802 provides fields for entering data into a client transaction name field 808, and a client transaction I.D. field 810. A client input field window 807 and an client output field window 809 show data that has been entered through a different graphical display. The New Client Transaction window 800 also provides a standard OK button 814 and a cancel button 816. In addition, an apply button 818 is provided for future enhancement but currently is unused.

If the administrator has opted not to create a client transaction 70, the logic repeats decision block 108 until such time as the administrator does opt to do so. On the other hand, if the administrator has chosen to create a client transaction 70, the logic proceeds to a block 110 where a client transaction 70 is created using the transaction name (field 808) and transaction ID (field 810) entered by the administrator in the new client transaction window 800. The creation of the actual client transaction 70 using this information will be described in more detail with reference to FIGS. 8, 20E and 20F.

Figure 20E:
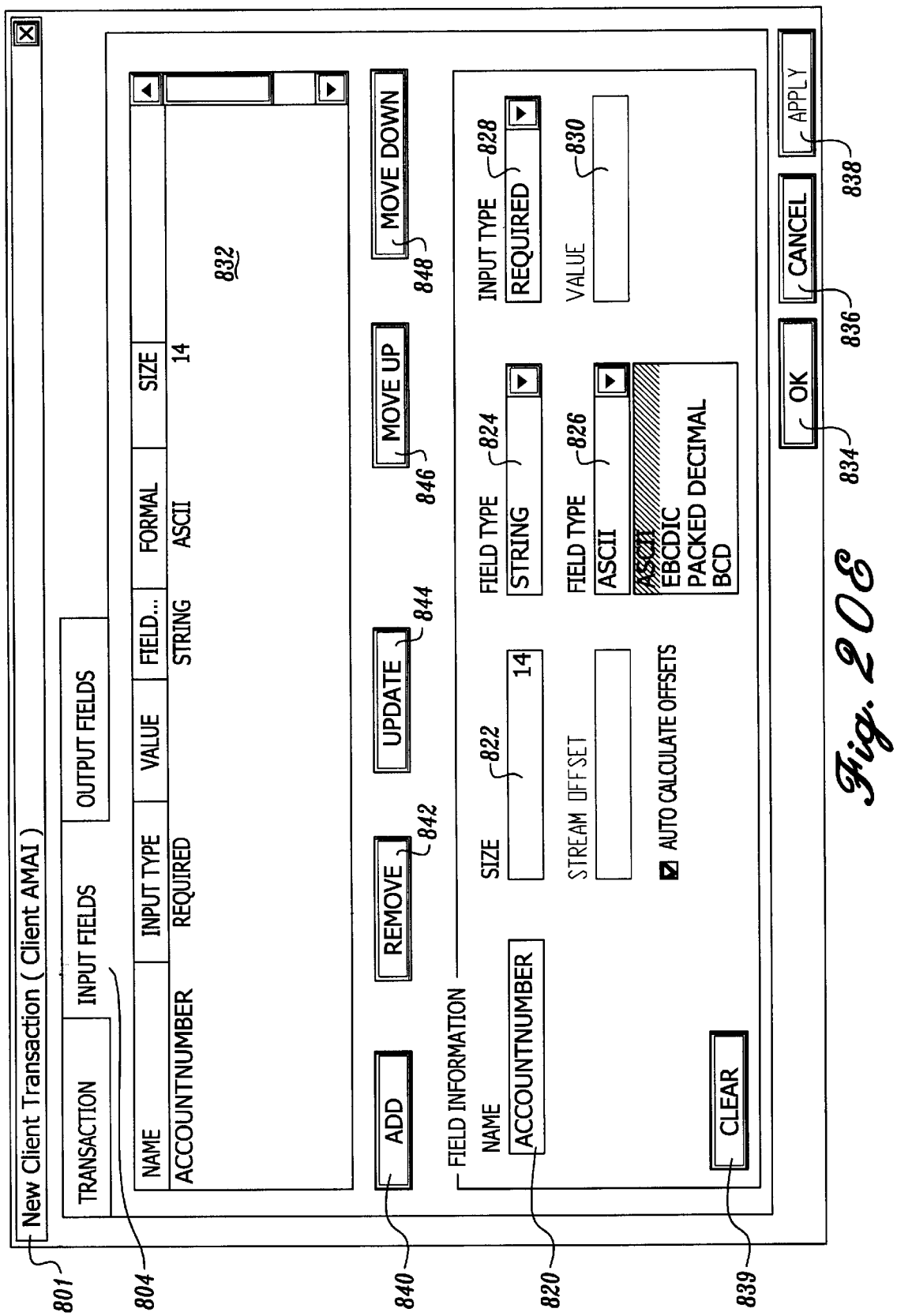
Figure 20G:
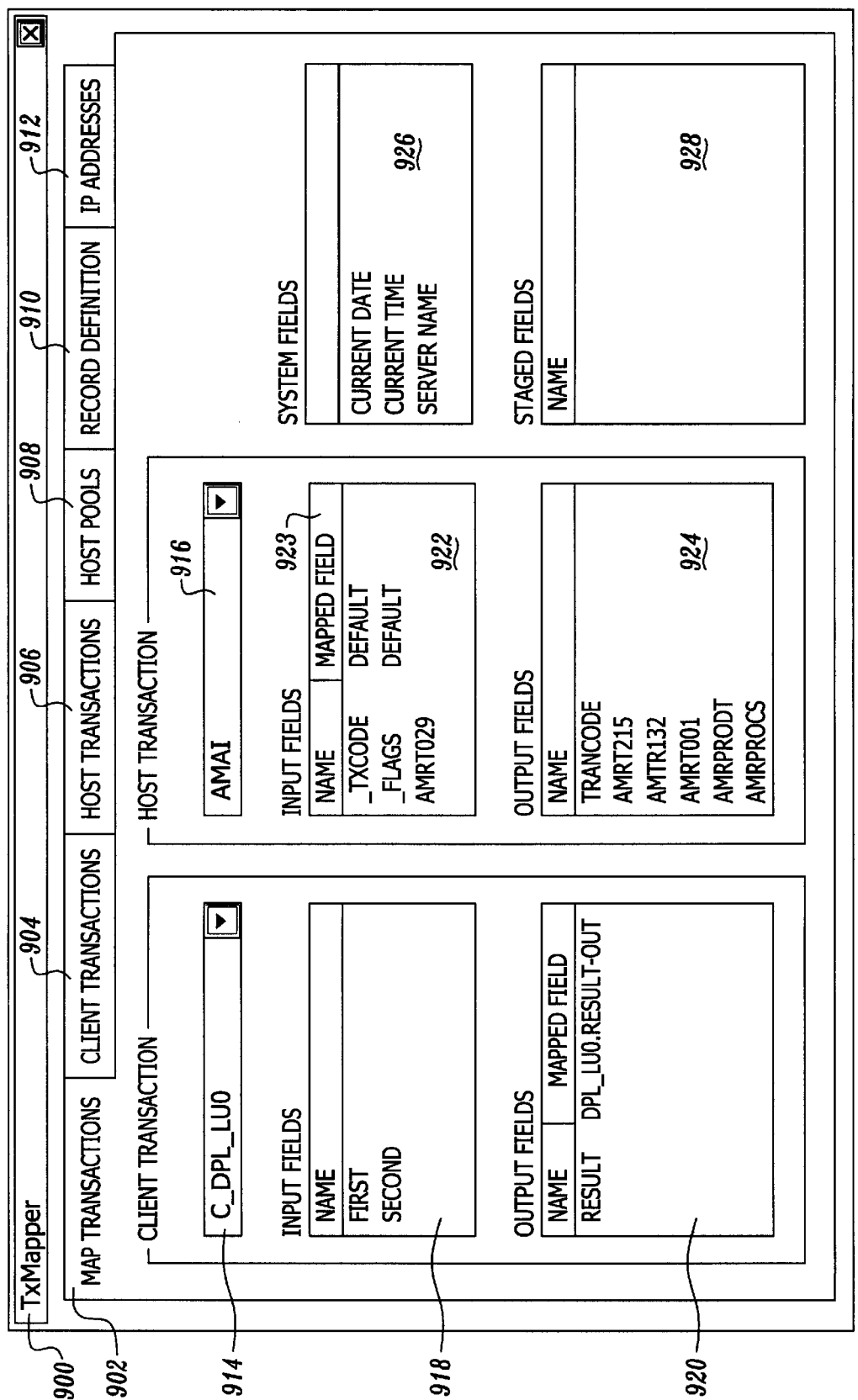

After creating the client transaction 70, the logic proceeds to block 112 where the administrator is allowed to map the client transaction 70 to the one or more host transactions 90 via a TxMapper window 900 generated by the GUI and shown in FIG. 20G. The process for mapping the client transaction 70 will be described in more detail below with reference to FIGS. 9 and 20G. The logic then proceeds to a decision block 114 where it determines if the administrator has opted to create another client transaction 70. If so, the logic returns to block 110 and blocks 110-114 are repeated until the administrator has created and mapped as many client transactions 70 as desired.

If another client transaction 70 is not created at this time, however, the logic proceeds from decision block 114 to a block 116 where a client transaction map is saved to the transaction configuration database 40. The client transaction map includes client input fields that reference host transaction input fields to which they are mapped. The reference may be represented by a text string indicating the host name and transaction name or any other indicator. Similarly, the client output fields reference host transaction output fields to which they are mapped. Once the client transaction map is saved, the configuration module ends in a block 117. As one of ordinary skill in the art will appreciate, FIG. 6 provides an overview of the configuration module 44 and the processing in the blocks may be performed in any order without departing from the scope of the present invention.

Figure 7:
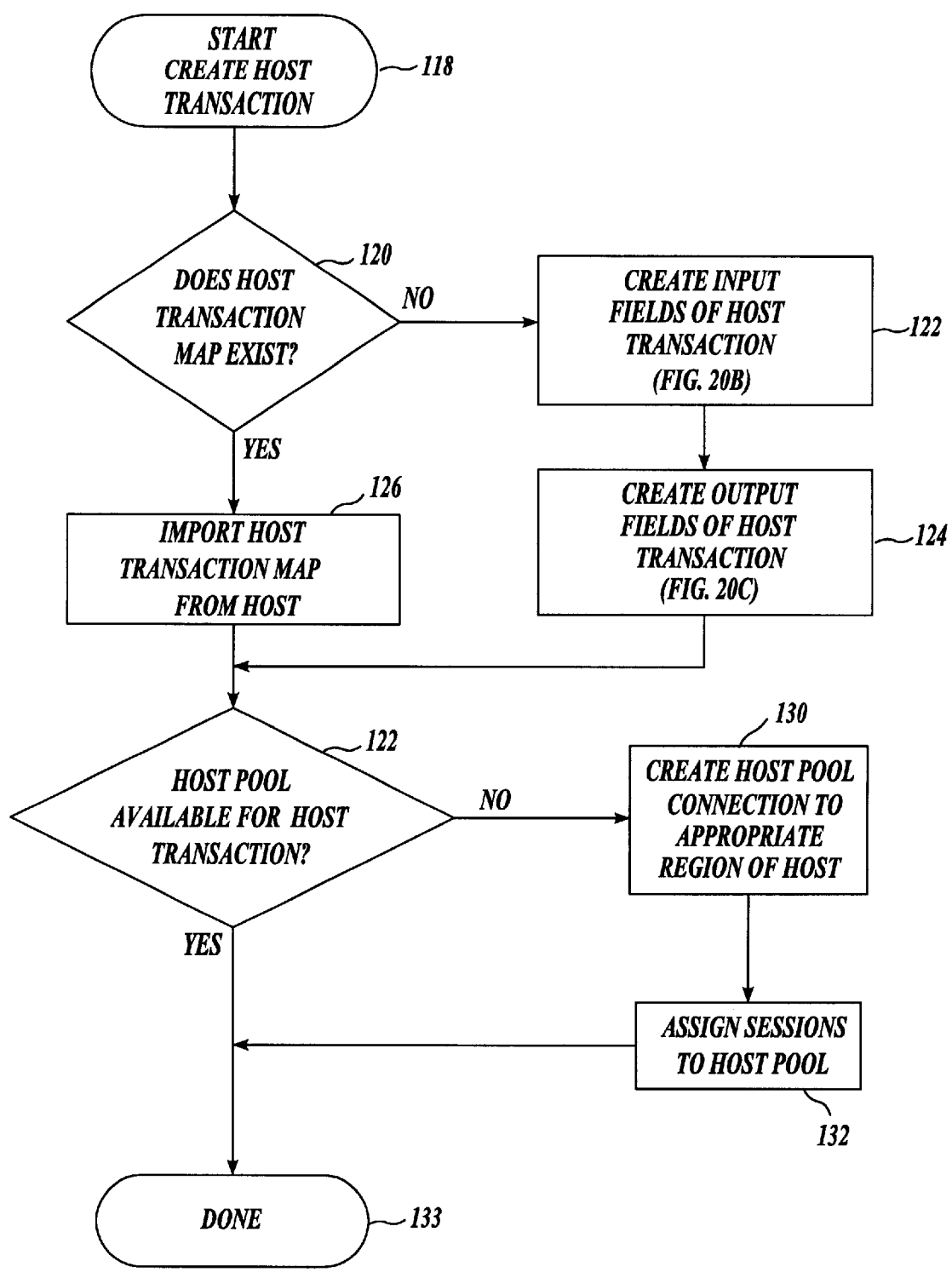
FIG. 7 is a flow diagram illustrating the logic used by the configuration module to create a host transaction to which a client transaction may be mapped.

FIG. 7 is a flow diagram illustrating the logic used to create a host transaction 90 as required in block 104 of FIG. 6. The logic begins in a block 118 and proceeds to a decision block 120 in which it determines if a host transaction map already exists. A host transaction map is a file that defines the input and output display data for a particular host transaction. For example, some host systems support an interface between an application program and a host application that allows input and output display data to be formatted without regard to control characters used by various terminals. An example is the Basic Mapping Support (BMS) map created by International Business Machines (IBM) Corp. If a host transaction map exists, the logic proceeds to a block 126 where the pre-existing host transaction map is imported from the host system 14 and is used rather than creating new input and output fields for the host transaction 90.

Returning to decision block 120, if a host transaction map does not exist, the logic proceeds to block 122 where the input fields 92 of the host transaction 90 are created by the administrator. More specifically, in one actual embodiment of the present invention shown in FIG. 20B, an edit host transaction window 701 is generated after the administrator inputs the transaction name (DPL_LU) and transaction ID of the host transaction 90 and selects the host input fields tab 704 in the new host transaction window 700 shown in FIG. 20A. The administrator may then create a host input 92 by entering a unique name for the specific host input being created in a host input name field 720.

The administrator may then enter additional information in the other fields which describes the content of the data for the input field specified in the host input name field 720. For example, a host input size field 722 indicates the size in bytes or other units for the particular host input field. A host input field type field 724 is used to specify the type of data that will be stored in the host input field. Typical types include string, integer, or byte stream. A host input format field 726 indicates the type of format for the host input field type specified in the host input field type field 724. Typical format entries for a string field type include ASCII, EBCDIC, Packed Decimal, and Binary Coded Decimal (BCD), for both the integer and bytes, the field type includes the number of bytes.

A host input type field 728 is also provided which stores a value that indicates whether the input field is required (needs a reference to a source of data) or if it is a default (static data). A host input value field 730 specifies the value that will be stored in the input field if the input type is default. The host input value field 730 is not applicable if the value that will be stored in the input field must be obtained from another source. It will be appreciated that the field type field 724, format field 726 and input type field 728 are each implemented as a pull-down menu from which the administrator may make a selection. Once all of the appropriate fields have been completed by the administrator (which completion has been signaled by selection of an ok button 734), the completed host input field 92 is illustrated in a host input window 732. For example, the host input field 92 with the name "TX" is shown having an input type specifying default, a value of L002, a field type of string, a format of EBCDIC, and a size of 4.

Returning to FIG. 7, after the host input fields 96 of the host transaction 90 are created, the logic proceeds to a block 124 where the output fields 98 of the host transaction 90 are created by the administrator. More specifically, in one actual embodiment shown in FIG. 20C, the edit host transaction window 703 is generated after the administrator selects an output fields tab 706 in the new host transaction window 700 shown in FIG. 20A. The administrator may then create a host output 94 by entering information in fields that are similar to the input fields shown in FIG. 20B. The numbering of the fields are denoted with a prime, "'", indicating that the description is the same but pertain to output fields rather than input fields. Therefore, the description for FIG. 20B described above also describes FIG. 20C. As will be appreciated, other methods of creating the input and output fields may be used without departing from the scope of the present invention.

Returning to FIG. 7, after the input fields 96 and output fields 98 are created in blocks 122 and 124, respectively, or after the host transaction map is imported from the host system 14, the logic proceeds to a decision block 128 in which it determines whether a host pool, i.e., an area of host storage, is available for submitting the host transaction 90 to the host system 14. The host pool associates each host transaction 90 with a specific context on the host system 14 to allow processing. As one of ordinary skill in the art will appreciate, a context is a system object that allows access to system objects through pointers. If no host pool is available, the logic proceeds to a block 130 where a host pool connection to the appropriate region of the host system 14 is created. The logic proceeds to a block 132 where sessions, i.e., periods of communication between the transaction server 12 and the host system 14, are assigned to the host pool. The logic then ends in a block 133.

The host system 14 has regions already defined, such as LU0 and LU2 regions. These regions are variable-size sub-divisions of dynamic area that allow processing to occur and are allocated to specific job or system task. The present inventions assigns each host transaction to the appropriate region. For example, as shown in FIG. 4, the "CICS" host connector interface module 51 for LU0 interface is assigned to the LU0 region of the host system 14. Each region has a plurality of working threads that are running and that may be assigned to host transactions 90. Host transactions 90 that are assigned to a particular region may share working threads in an asynchronous manner. The assignment of a working thread is for the duration of the execution of the transaction, however, the transaction may relinquish its thread while waiting for some event. This allows the present invention to add additional client devices 20 without impacting the performance of the host system 14. Returning to decision block 128 of FIG. 7, if the host pool is available for the host transaction 90, no additional processing is necessary to create a host pool and assign sessions. Therefore, the logic immediately ends in a block 133.

Figure 8:
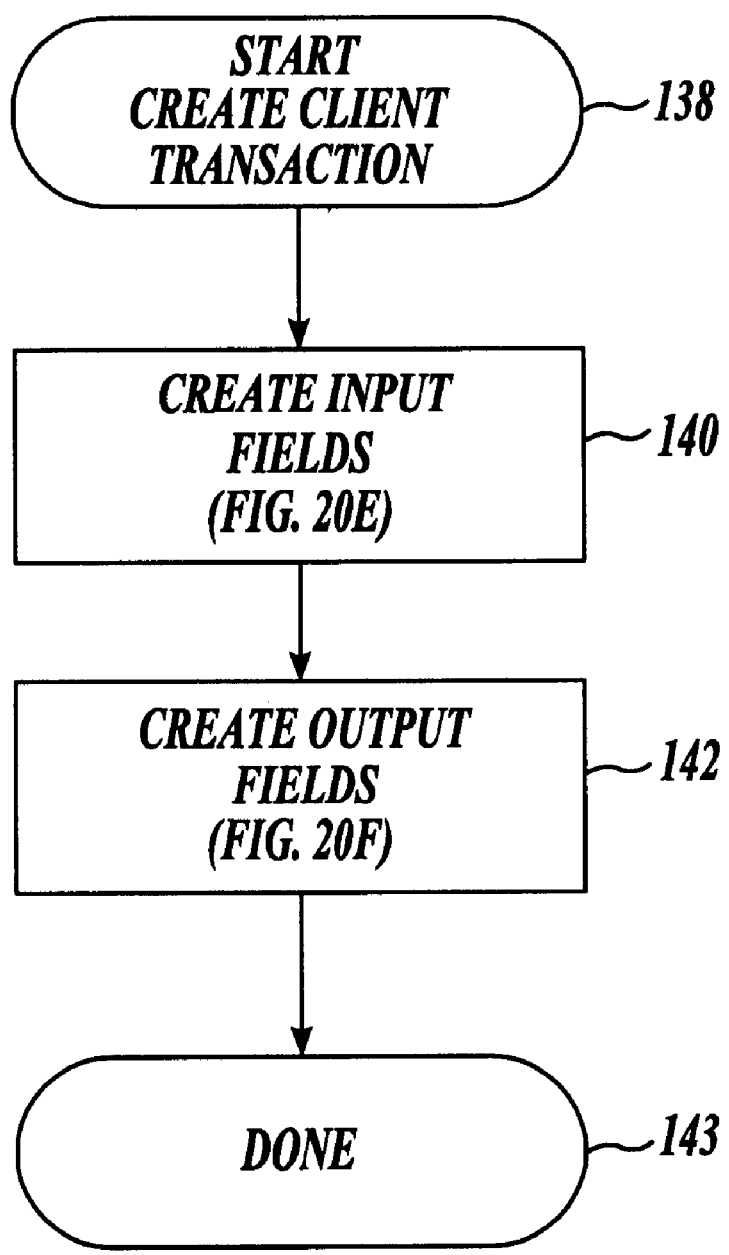
FIG. 8 is a flow diagram illustrating the logic used by the configuration module to create the client transaction to which one or more host transactions may be mapped.

As noted above in reference to FIG. 6, once the desired host transactions 90 are created (blocks 102–106), at least one client transaction 70 must be created to map to the host transaction 90. In this regard, FIG. 8 illustrates the logic used to create a client transaction 70 as required in block 110 of FIG. 6. The logic begins in a block 138 and proceeds to a block 140 in which the input fields 86 for the client transaction 70 are created by the administrator. As is shown in more detail in FIG. 20E, the GUI 42 generates an edit client transaction window 801 after the administrator selects an input fields tab 804 in the new client transaction window 800. The administrator may then create the client input fields by entering a unique name for the specific client input being created in a client input name field 820.

The administrator may then enter additional information in the other fields which describe the content of the data for the input field specified in the client input name field 820. A client input size field 822 indicates the size in bytes or other units for the particular client input field. A client input field type field 824 is used to specify the type of data that will be stored in the client input field. Typical types include string, integer, or byte stream. A client input format field 826 indicates the type of format for the client input field type specified in the client input field type field 824. Typical format entries for a string field type include ASCII, EBCDIC, Packed Decimal, and Binary Coded Decimal (BCD) and for both integer and byte stream, the field type includes a number representing the number of bytes. A client input type field 828 stores a value that indicates whether the input field is required (requires a reference to a data source) or if it is a default (static data). A client input value field 830 specifies the value that will be stored in the input field if the input type is default. The client input value field 830 is not applicable if the value that will be stored in the input field must be obtained from another source. It will be appreciated that the field type field 824, format field 826 and input type field 828 are each implemented as a pull-down menu. Once all of the appropriate fields have been completed by the administrator, the completed client input field 86 is illustrated in a client input window 832. For example, the client input field 86 with the name "AccountNumber" is shown having an input type specifying required, a field type of string, a format of EBCDIC for the string, and a size of 14 bytes.

Returning to FIG. 8, after the client input fields 86 have been created, the logic proceeds to a block 142 in which the output fields 88 of the client transaction 70 are created by the administrator. As shown in more detail in FIG. 20F, the GUI 42 generates the edit client transaction window 803 after the administrator selects an output fields tab 806 from the new client transaction window 800. The administrator may then create the client input fields 86 by entering information in fields that are similar to the client input fields shown in FIG. 20E. The numbering of the fields are denoted with a prime, "'", indicating that the description is the same but pertain to output fields rather than input fields. Therefore, the description for FIG. 20E described above also describes FIG. 20F. After the output fields 88 and input fields 86 of the client transaction 70 have been created, the logic of FIG. 8 ends in a block 143.

Figure 9:
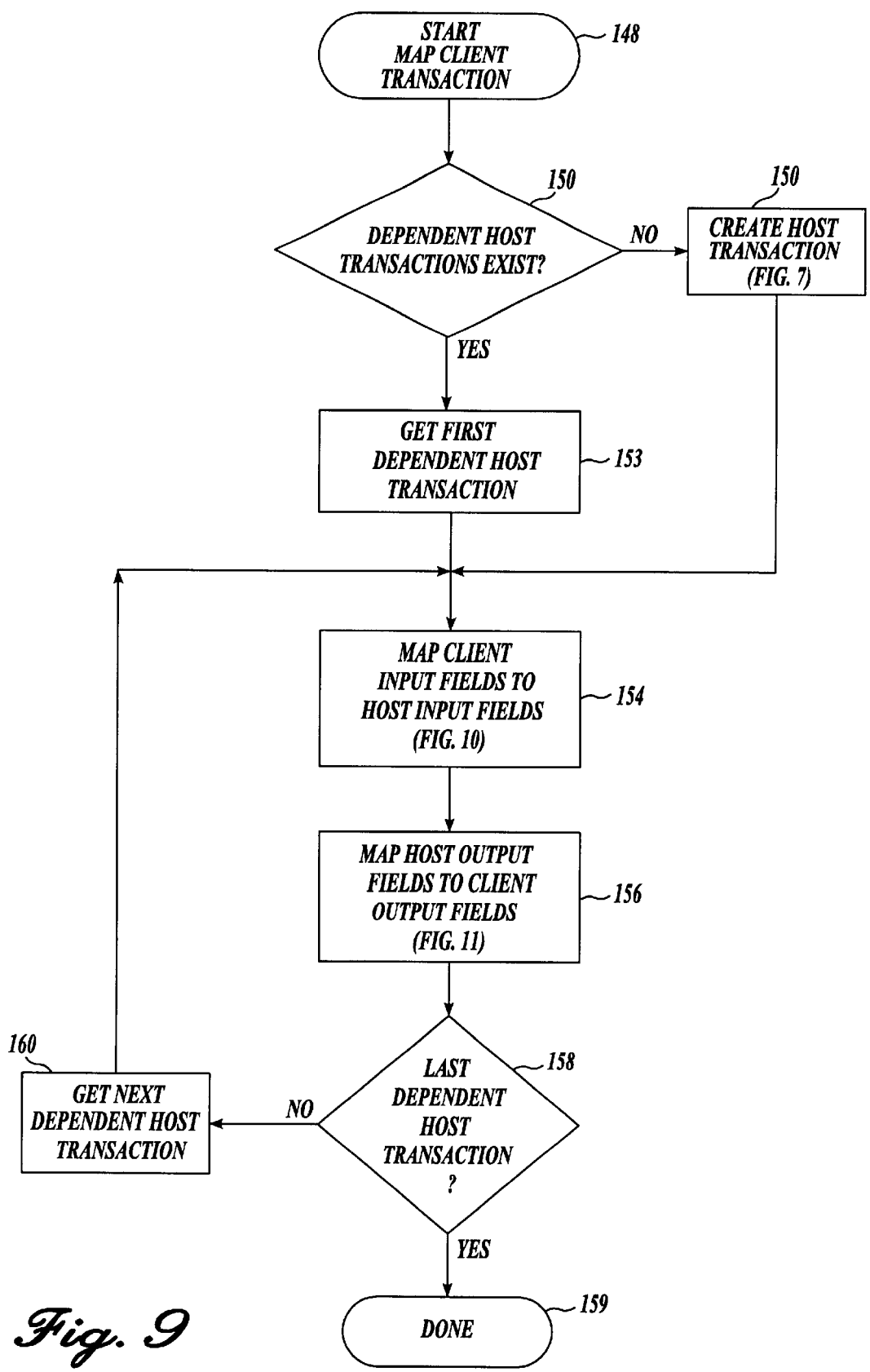
FIG. 9 is a flow diagram illustrating the logic used by the configuration module to map the client transaction to the previously created host transactions.

As noted above in reference to FIG. 6, once a desired client transaction 70 has been created (block 110), the administrator is allowed to map the client transaction 70 to the previously created host transaction(s) (block 112). FIG. 9 is a flow diagram illustrating logic used by the configuration module 44 to enable the administrator to map a client transaction 70 to one or more host transactions as required in block 112 of FIG. 6. In general, the mapping process associates a client transaction 70 with the host transactions 90 required to obtain the data from the host system 14. The associated host transactions 90 are referred to as "dependent host transactions" because the client transaction 70 is dependent upon them.

The logic of FIG. 9 begins in block 148 and proceeds to a decision block 150, in which it determines whether dependent host transactions 90 exist for the given client transaction 70. If so, the logic proceeds to a block 153 where the first dependent host transaction is obtained. If at least one dependent host transaction does not exist, the logic proceeds to a block 152 where the host transaction is created according to the process described above and illustrated in FIG. 7.

Once at least one dependent host transaction 90 exists, the logic proceeds to a block 154 where the client input fields 86 of the given client transaction 70 are mapped to the appropriate host input fields 96 of the dependent host transaction 90. As shown in more detail in FIG. 20G, the GUI 42 generates a TxMapper window 900 when the administrator selects a map transaction tab 902. Using the TxMapper window 900, the administrator can easily create client to host transaction mappings using a drag and drop feature to drag and drop input and output fields upon each other. This process is described in more detail below with reference to FIGS. 10 and 20G.

Returning to FIG. 9, once the client input fields 86 have been mapped to the host input fields 96, the logic proceeds to a block 156 where administrator is allowed to map the host output fields 98 of the current dependent host transaction 90 to the client output fields 88 of the given client transaction 70 via the TxMapper window 900, as will be described in more detail with reference to FIGS. 11 and 20G. Next, in a decision block 158 the logic determines if the current dependent host transaction 90 is the last dependent host transaction required to properly map the client transaction 70. If not, the logic proceeds to a block 160 where the next dependent host transaction 90 is retrieved. The logic then returns to block 154 and blocks 154–160 are repeated until all of the dependent host transactions 90 associated with the given client transaction 70 have been mapped to the client transaction 70. Accordingly, if the current dependent host transaction 70 is the last dependent host transaction, the mapping of the client transaction 70 is complete and the logic ends in a block 159.

Figure 10:
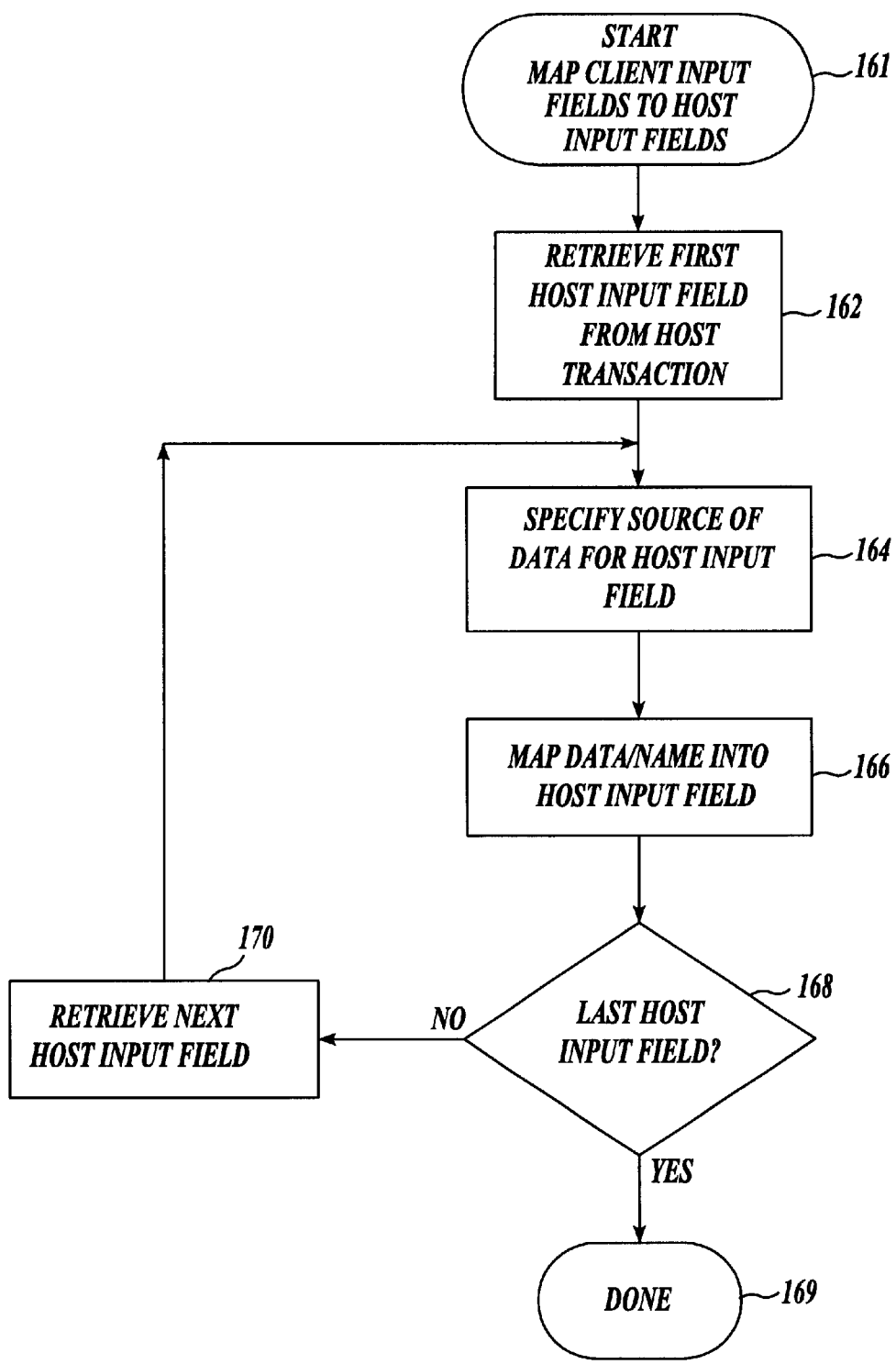
FIG. 10 is a flow diagram illustrating the logic used by the configuration module to map client input fields contained in the client transaction to host input fields contained in previously created host transactions.

FIG. 10 is a flow diagram illustrating the logic used by the configuration module 44 to map the client input fields 86 of the given client transaction 20 to the host input fields 96 of the dependent host transaction 90 as required in block 154 of FIG. 9. The logic begins in a block 161 and proceeds to a block 162 in which a first host input field 96 (current host input field) (see HAI-1 in FIG. 5) is retrieved from the host transaction 90. The logic then proceeds to a block 164 where the administrator specifies the source of the data for the current host input field 96 of the dependent host transaction 90. As explained earlier in reference to FIGS. 7 and 20B, if the administrator selects "default" in the host input type field 728, the administrator also specifies the value in the host input value field 730. However, if the administrator selected "required" in the host input type field 728, the administrator must then map the host input to a system setting, a host output from a different transaction, or a client input. This mapping will be described with reference to FIG. 20G. The source of the data may be host output data (i.e., data stored in the host output field of another host transaction 90), static data (e.g., such as default values or system settings), or client input data (i.e., data stored in the client input field of the client transaction 70 being mapped). The logic then proceeds to a block 166 where the administrator maps the source of data to the current host input field 96 using a drag-drop operation.

More specifically, as shown in FIG. 20G, a client transaction pull-down menu 914 allows the administrator to select the client transaction 70 to be mapped (C_DPL_ LU0). Once the client transaction is selected, the client input fields 96 (first,second) appear in a client transaction input field window 918 and the client output fields 98 (result) appear in a client transaction output field window 920. The administrator then uses the host transaction drop-down menu 916 to select the first dependent host transaction (AMAI). Again, once the first dependent host transaction is selected, a host input field window 922 displays the host input fields 96 required for the selected host transaction and a host output field window 924 displays the host output fields 98 obtained from the host system 14 after processing the host transaction. For example, the administrator may drag the client input field "first" over to the host input field "AMRTO29" and drop "first" in a mapped field 923 associated with the desired host input field "AMRTO29". One will note that host input field "_TXCODE" is mapped to a default which means that the mapped data is static.

After the first host input field 96 is mapped, the logic proceeds to a decision block 168 where it determines if the last host input field 96 in the dependent host transaction 90 has been processed. If not, the logic proceeds to a block 170 where the next host input field 96 is retrieved and becomes the current host input field. The logic then returns to block 164 and blocks 164–170 are repeated until all of the host input fields 96 of the dependent host transaction 90 have been mapped. Accordingly, at decision block 168, if the current host input field of the dependent host transaction is the last host input field, the mapping of the client input fields to host input fields is complete and the logic ends in a block 169.

Figure 11:
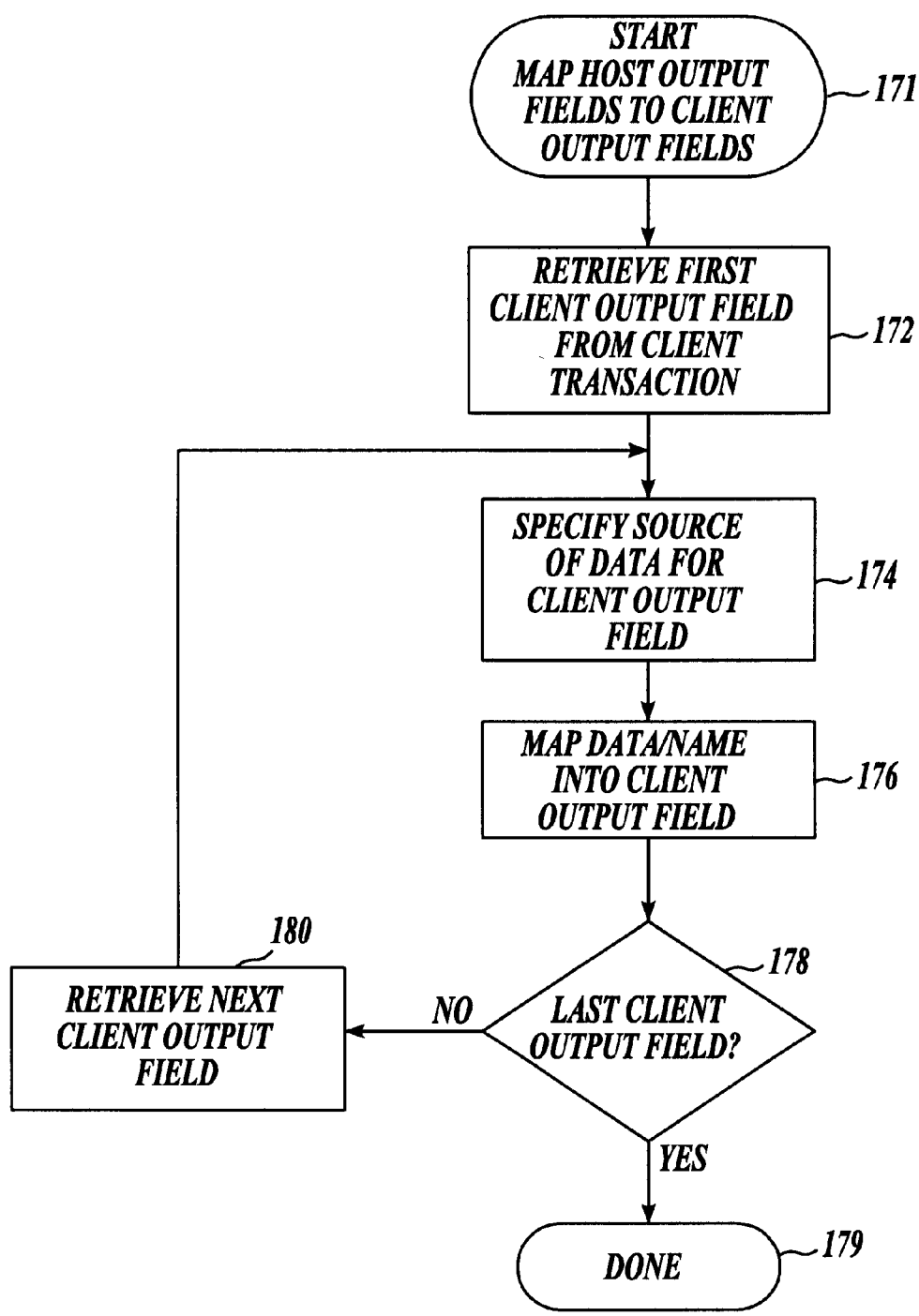
FIG. 11 is a flow diagram illustrating the logic used by the configuration module to map client output fields contained in the client transaction to host input fields contained in previously created host transactions.

FIG. 11 is a flow diagram illustrating the logic used by the configuration module 44 to map host output fields 98 to client output fields 88 as required in block 154 of FIG. 9. The logic begins in a block 171 and proceeds to a block 172 in which a first client output field 88 (the current client output field) (see CO-1 in FIG. 5) is retrieved from the client transaction 70 being mapped. The logic then proceeds to a block 174 where the administrator specifies the source of data (i.e., data output, static or client input as mentioned above) for the current client output field 88. Again, this was previously explained with reference to FIG. 20E illustrating how the administrator may select "default" or "required" in the client input type field 828. The logic then proceeds to a block 176 where the administrator maps the source of data to the current client output field 88 (see "HAO-1" stored in CO-1 in FIG. 5) using a drag-drop operation.

More specifically, as shown in FIG. 20G, the client transaction pull-down menu 914 and the host transaction pull-down menu 916 are used by the administrator to select the client transaction 70 and the host transaction 90 to be mapped, as described above. In this case, however, the administrator selects a host transaction output field 96 (AMRT215) and drags it over to the client transaction output fields window 920 and drops it in a client mapped field 921 associated with the desired client output 88.

After the client output field 88 is mapped, the logic proceeds to a decision block 178 in which it determines whether the current client output field 88 is the last client output field in the given client transaction 70. If not, the logic proceeds to block 180 where the next client output field 88 of the client transaction 70 is retrieved and becomes the current client output field. The logic then returns to block 174 and blocks 174–180 are repeated until all of the client output fields 88 of the given client transaction 70 have been mapped. Accordingly, in a decision block 178, if the current client output field 88 of the client transaction 70 is the last client output field, the mapping of the client output fields 88 is complete and the logic ends in a block 179.

Referring now to FIG. 20G, the TxMapper window 900 also includes a system fields window 926 and a staged field window 928. The system fields window 926 contains references for system information 927, such as current date, time, and server name. It will be appreciated that the system information 927 may be similarly dragged and dropped to either the host input fields window 922 or the client output field window 920, as described above. The staged fields window 928, on the other hand, is used by the administrator as a temporary storage for host output fields 98 that may be used as the data source for host transaction input field 96 (see "HBO-1" stored in HAI-3 in FIG. 5) in another host transaction 90. The administrator would first select a host transaction using the host transaction pull-down menu 916, select the desired host output field 98, and drop it in the staged field window 928. Then, the administrator can select the other host transaction and drag the output in the staged field window 928 to the host input field window 922 of the other host transaction. As mentioned earlier, this embodiment allows the creation and the mapping for the client transaction to be performed using a graphical means without having the user write any of the underlying code.

As mentioned above in reference to FIG. 6, once the administrator has created and mapped all the desired client transactions 70, the client transaction map is stored in the transaction database 40 for access by the run-time transaction module 48. Once the data is stored in this manner, sufficient information is available to start the run-time transaction module 48 for providing direct transaction access to data residing on the host system 14.

Figure 12:
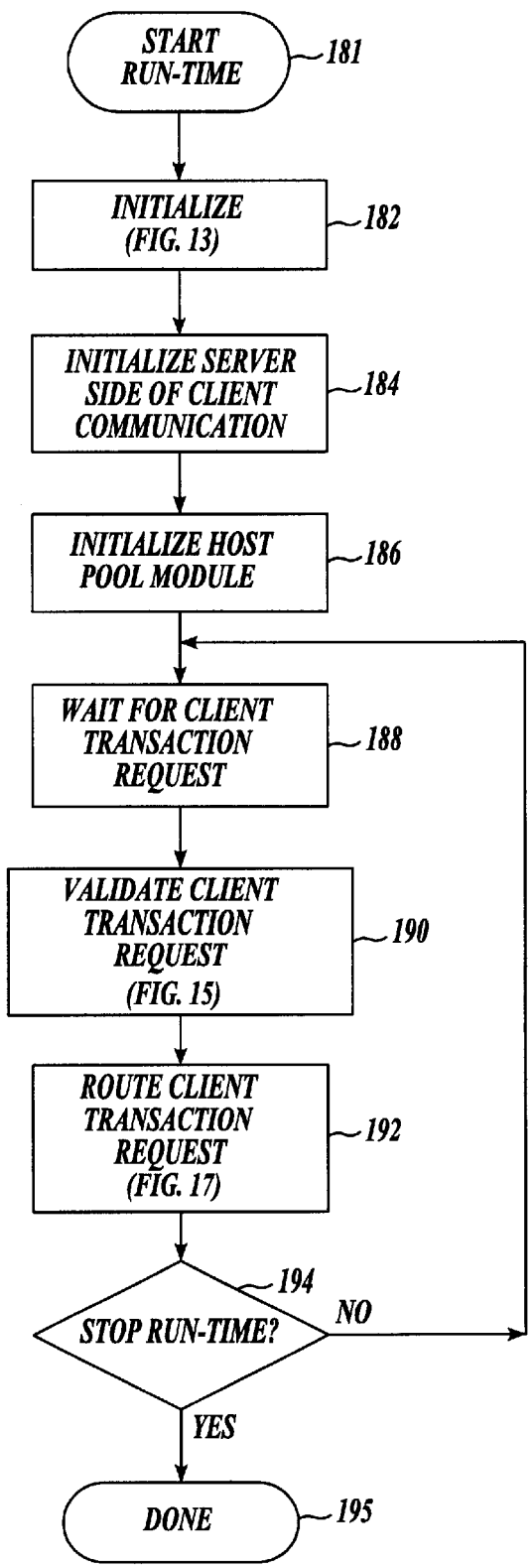
FIG. 12 is a flow diagram illustrating an overview of the logic used by a run-time transaction module of the direct transaction mapping program to obtain host stored data in response to client transaction requests made by a client device.

FIG. 12 is a flow diagram illustrating an overview of the run-time transaction module 48 of the direct transaction mapping program 38. The logic begins in a block 181 and proceeds to a block 182, in which the run-time transaction module 48 is initialized. This initialization process 48 will be described in more detail below and in reference to FIG. 13. Briefly, the initialization process opens the transaction database 40 and builds a template of each client to host transaction mapping stored therein. These templates are then used to route client transaction requests made by client devices 22 to the host system 14 in order to obtain the appropriate host information. After initializing the run-time transaction module 48, the logic proceeds to a block 184 where the server side of the client communication is initialized by opening sockets, checking for resources, staring worker threads to which client transactions are assigned to allow processing, etc. Next, in a block 186 the host pool module 52 is initialized so that sessions between the transaction server 12 and the host system 14 may begin. Because the initialization necessary to establish communication with the host system 14 is readily known by one skilled in the art, a further description will not be provided herein. The logic then proceeds to a block 188 where the logic waits to receive a client transaction request from a client device 20. Once a client transaction request is received, the logic proceeds to block 190 where the client transaction request is validated by the run-time transaction module 48 to ensure that a template corresponding to the requested transaction exists. The validating process is described in more detail below and in reference to FIG. 15.

The logic then proceeds to block 192 where the client transaction request is routed and the host transactions 90 that are mapped to the requested client transaction 70 are submitted to the host system 14 in order to obtain the appropriate data. The processing of the client transaction request is described in more detail in reference to FIG. 17. The logic then proceeds to a decision block 194 where it determines if the administrator has requested to stop run-time operations. If the answer is no, the logic returns to block 188 where the process waits for another client transaction request and blocks 188–194 are repeated accordingly. If run-time operation is stopped, the logic ends in a block 195. Once run-time operation is stopped, the transaction server 12 no longer routes transactions and performs a process that may deallocate resources.

Figure 13:
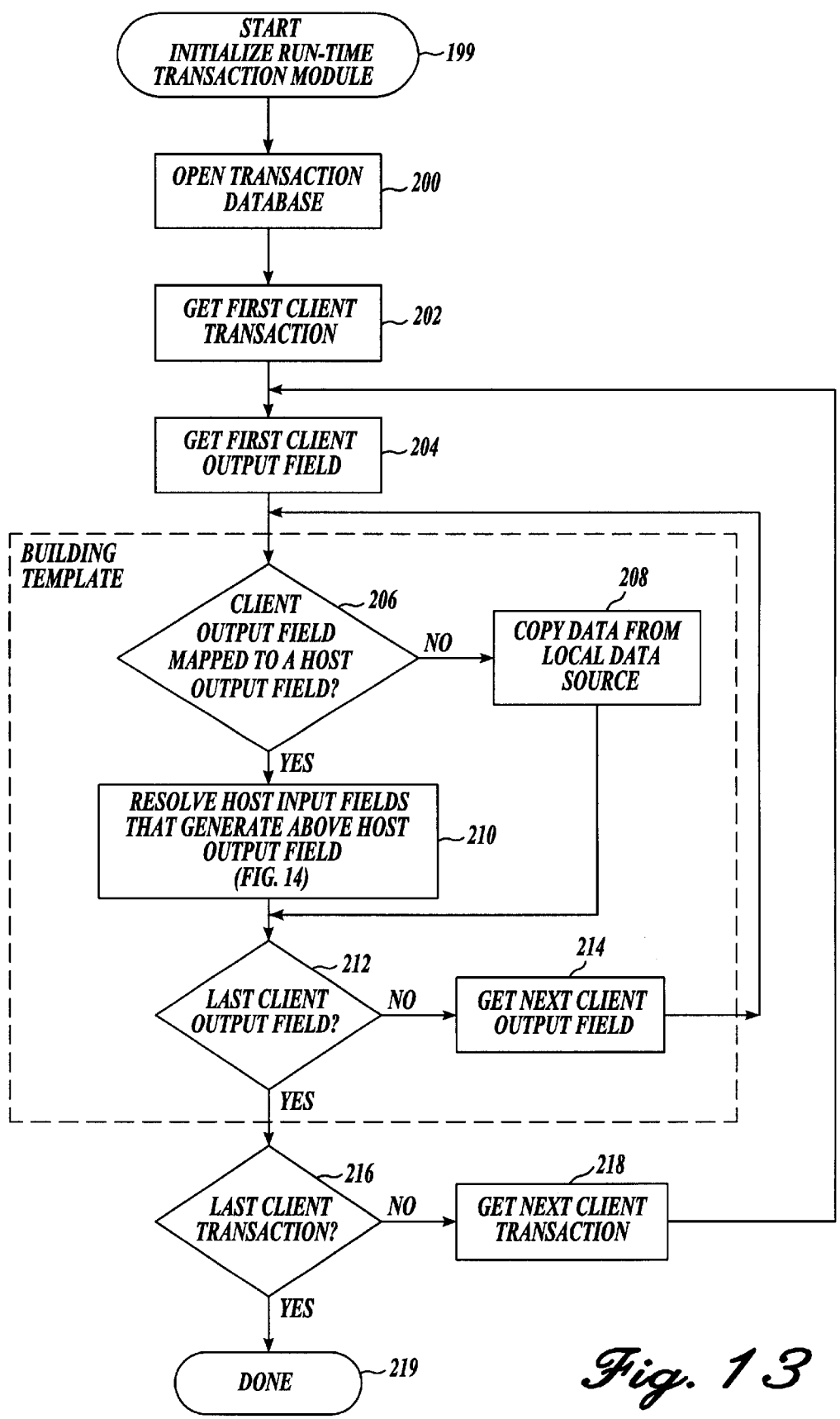
FIG. 13 is a flow diagram illustrating the logic used by the run-time transaction module to initialize itself.

FIG. 13 is a flow diagram illustrating the logic used by the run-time transaction module 48 to initialize the run-time transaction module as required in block 182 of FIG. 12. In general, the initialization process builds a template for each client to host transaction mapping stored in the transaction configuration database 40 by resolving the references (typically textual references) in the client output fields and the host input fields stored in the transaction database 40 to addressable references (pointers) that are executed during the run-time operation Resolving the references to addressable references at this time provides faster processing of transactions.

The logic in FIG. 13 begins in a block 199 and proceeds to a block 200 in which the transaction database 40 created by the configuration module 44 is opened. Next, in a block 202 the first client transaction 70 stored in the transaction database 40 is retrieved. As one of ordinary skill in the art will appreciate, the contents of the entire transaction database 40 may be loaded into mass memory 36 of the transaction server 12 at one time or may be loaded in smaller portions when needed. The logic then proceeds to block 204 where the contents of the first client output field 88 (current client output field) of the retrieved client transaction 70 is read. At a decision block 206, the logic determines whether the current client output field 88 (see CO-1 in FIG. 5) is mapped to a host output field 98. If not, the client output field 88 must be mapped to a local data source (e.g., system time, system date) and the logic proceeds to a block 208 where data from a local data source is copied into the client output field.

If the current client output field 88 is mapped to a host output field 98 (see, for example, CO-1 mapped to HAO-1 in FIG. 5), the logic proceeds to a block 210 where the host input fields (see HAI-1, HAI-2, HAI-3 in FIG. 5) that generate the content for the host output field (see HAO-1 in FIG. 5), i.e., the host input fields 96 of the same host transaction 90, are resolved to addressable references, such as pointers. The process of resolving the host input field 96 is described in more detail below and in reference to FIG. 14. After resolving the host input fields 96, the logic proceeds to a decision block 212 where it determines whether the current client output field 88 is the last client output field in the retrieved client transaction 70. If not, the logic proceeds to block 214 where the next client output field 88 is retrieved from the retrieved client transaction 70 and becomes the current client output field. The logic then returns to decision block 206 and blocks 206–214 are repeated for each client output field 88. It will be appreciated that the processing performed in blocks 206, 208, 210, 212, and 214 create a template for the client transaction that is used during validation and described in FIG. 15.

If the current client output field 88 (see CO-3 in FIG. 5) is the last client output field in the retrieved client transaction 70, the logic proceeds to a decision block 216 where a decision is made whether the current client transaction 70 is the last client transaction in the transaction database 40. If not, the next client transaction 70 is retrieved in a block 218 and blocks 204–218 are repeated for each client transaction 70 stored in the transaction database 40. At decision block 216, if the current client transaction 70 is the last client transaction, the process of initializing the run-time transaction module 48 is complete and the logic ends in a block 219.

Figure 14:
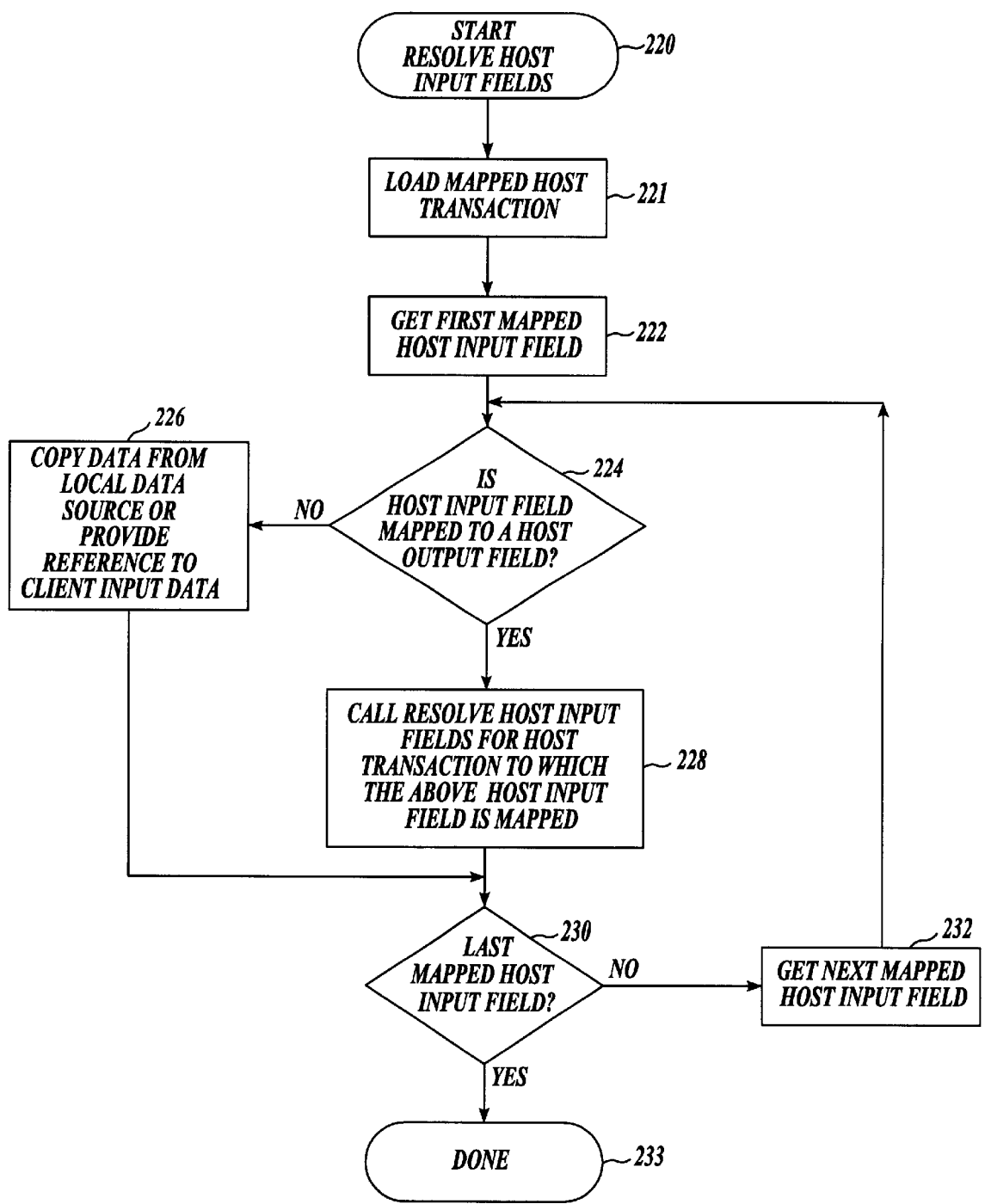
FIG. 14 is flow diagram illustrating the logic used by the run-time transaction module to resolve mapped host input fields.

FIG. 14 is a flow diagram illustrating the logic used to resolve host input fields as required in block 210 of FIG. 13. The logic begins in a block 220 and proceeds to a block 221 in which a previously mapped host transaction 90 is loaded from the transaction database 40. It will be appreciated that the host transaction 90 was mapped to the current client transaction 70 by the configuration module 44 as described above. The logic then proceeds to a block 222 where the first mapped host input field 96 (the current mapped host input field) (see HAI-1 in FIG. 5) is obtained from the host transaction 90. The logic then proceeds to a decision block 224 where it determines if the current host input field 96 is mapped to a host output field 98 from another host transaction 90. If not, the logic proceeds to a block 226 where data from a local data source or the addressable reference to the client input data is stored in the current host input field (see HAI-1 and HAI-2 in FIG. 5).

Returning to decision block 224, if the current host input field 96 is mapped to a host output field 98 of another transaction 90 (see, for example, HAI-3 in FIG. 5), the logic proceeds to a block 228 where the host input fields 96 of the other host transaction to which the current host transaction is mapped are first resolved. Accordingly, a recursive call to the same logic depicted in FIG. 14 is made and the host transaction 90 loaded and resolved is the host transaction that has a host output field mapped to a host input field. An example of such processing is shown in FIG. 5 where host transaction A input field HAI-3 is mapped to host transaction B output field HBO-1. Therefore, host transaction B must have its host input fields (HBI-1 and HBI-2) resolved before host transaction A input field HAI-3 can be resolved. Accordingly, the process continues to resolve host transactions 90 until a host transaction does not have a host input field 96 that references another host transaction. Once this recursive process completes, the logic proceeds in FIG. 14 to a decision block 230 where it determines if the current host input field 96 is the last mapped host input field in the loaded host transaction 90. If not, the logic proceeds to a block 232 where the next mapped host input field 96 is retrieved and becomes the current mapped host input field. The logic then returns to decision block 224 and blocks 224–232 are repeated for each mapped host input field 96 in the loaded host transaction 90. At decision block 230, if the current mapped host input field is the last mapped host input field (see, for example, HBI-2 in FIG. 5), resolution of the host input fields is complete and the logic ends in a block 233.

Figure 15:
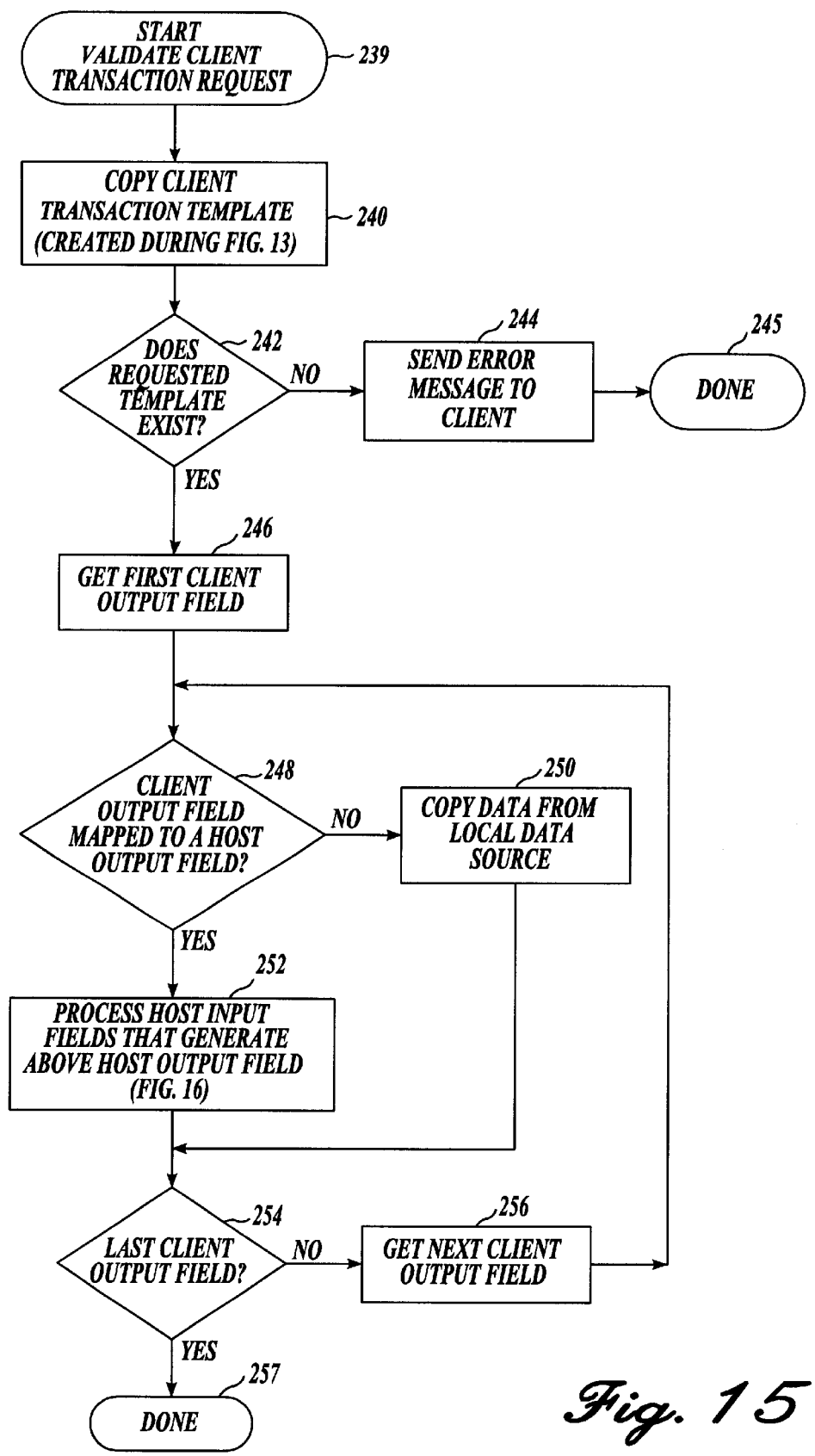
FIG. 15 is a flow diagram illustrating the logic used by the run-time transaction module to validate a client transaction request.

FIG. 15 is a flow diagram illustrating the logic used to validate client transaction requests submitted by client devices 20 as required in block 190 of FIG. 12. Validating the client output field 88 of a client transaction request 90 uses similar logic as described in FIG. 14 for resolving host input fields 96. The logic begins in a block 239 and proceeds to a block 240 in which the client transaction template that was created while initializing the run-time transaction module 48 is copied so that the client and host input and output fields of the client transaction 70 and host transaction 90 do not need to be resolved again when a client transaction is requested. By using the template, the present invention can validate the client transaction requests in a timely manner before processing. In another actual embodiment, instead of using a template, the validation process resolves the input and outputs for each client transaction request when the client transaction request is received. In the embodiment using the templates, however, after copying the client transaction template, the logic proceeds to a decision block 242 where it determines whether the requested template exists. If the template does not exist, the logic proceeds to a block 244 where an error message is sent to the client device 20. The logic then ends in a block 245.

Returning to decision block 242, if the template exists, the logic proceeds to a block 246 where the first client output field 88 (current client output field) of the requested client transaction template is retrieved. The logic then proceeds to a decision block 248 where it determines if the current client output field 88 is mapped to a host output field 98. If not, the logic proceeds to a block 250 where the data from a local data source is stored in the current client output field 88. A local data source may include static data or data from a system call. Typically, referring back to decision block 248, the current client output field 88 is mapped to a host output field 98 so the logic proceeds to a block 252 where the host input fields 96 that generate the host output field 98 are processed. The processing of the host input fields is described in more detail below and in reference to FIG. 16. The logic then proceeds to a decision block 254 where a decision is made whether the current client output field 88 is the last client output field in the template. If not, the logic proceeds to a block 256 where the next client output field is retrieved and becomes the current client output field. The logic then returns to decision block 248 and blocks 248–256 are repeated until all of the client output fields 88 have been processed.

Returning to decision block 254, if the current client output field 86 is the last client output field, validation of the client transaction request is complete and the logic ends in a block 257. It will be appreciated that the validation process provides an additional check to insure that the client to host mappings are correct and that the client output fields 88 are resolved properly to existent host output fields 98. If a mapping is resolved incorrectly (i.e., resolved to a non-existent address), the run-time transaction module 48 will experience a failure.

Figure 16:
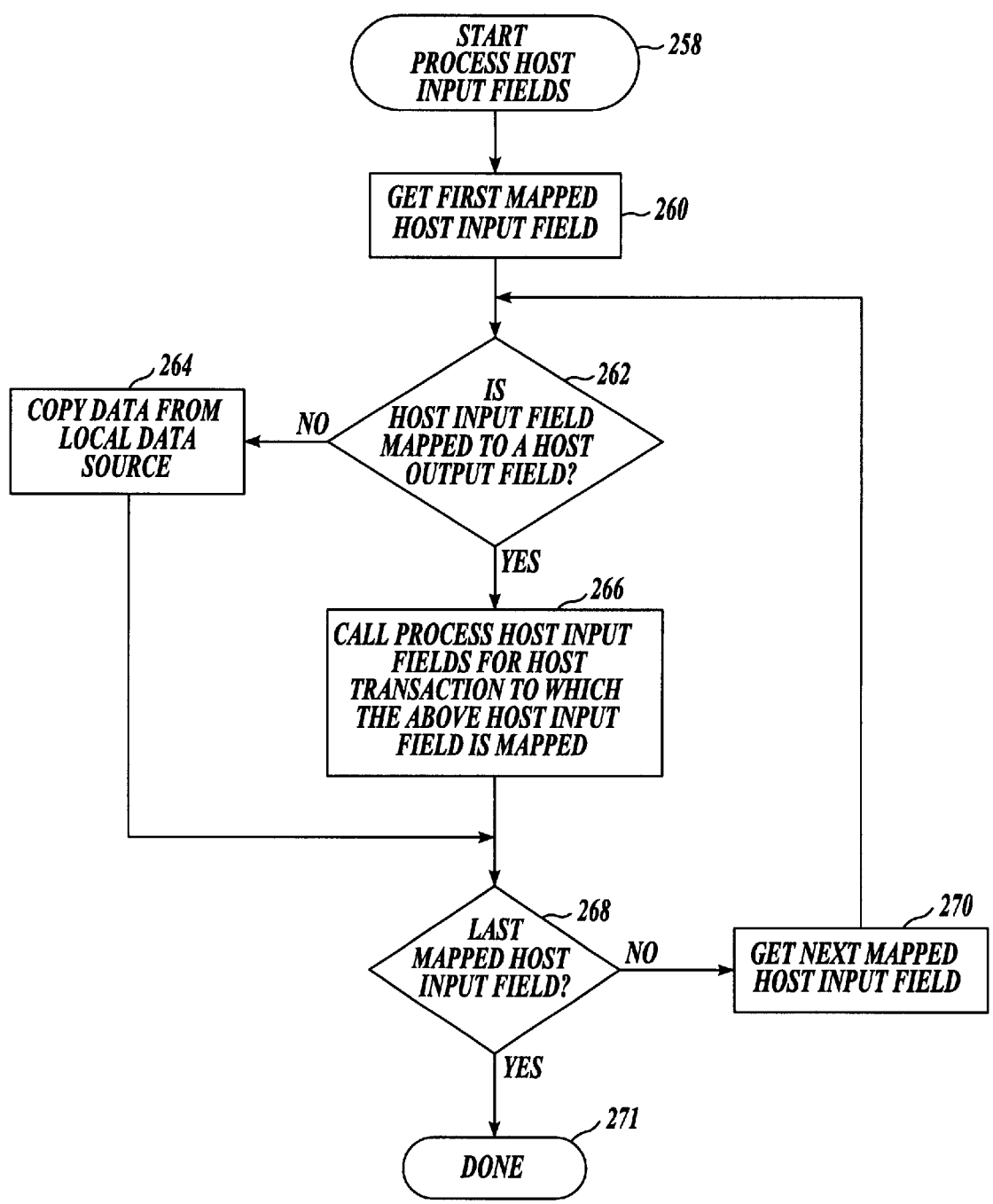
FIG. 16 is a flow diagram illustrating the logic used by the run-time transaction module to process host input fields in response to a client transaction request.

FIG. 16 is a flow diagram illustrating the logic used to process host input fields as required in block 252 of FIG. 15. As an overview, validating a client transaction request includes validating that the references needed to obtain the desired data from the host system 14 exist and are properly mapped to the client output fields 88. As mentioned earlier, references may be text strings indicating the host name, transaction name and input name or may be any other type of indicator. The client transaction output fields 88 must be properly mapped and any host transaction 90 that generates data for the client transaction output field 88 must have its input fields 96 properly mapped as well. FIG. 16 is directed at insuring the host input fields 96 are properly mapped.

The logic begins in a block 258 and proceeds to a block 260 in which the first mapped host input field 98 (current mapped host input field) is retrieved from the host transaction 90 mapped to the client transaction 70. The logic then proceeds to a decision block 262 where it determines if the current host input field 88 is mapped to a host output field 98. If not, the logic proceeds to a block 264 to copy data from a local data source to the current host input field (see, for example, HAI-2 in FIG. 5). On the other hand, if the host input field 96 is mapped to a host output field 98 in another host transaction 90 (see, for example, HAI-3 in FIG. 5), a recursive call to the same logic depicted in FIG. 16 is made in a block 266 and the host input field 96 that is mapped is the host transaction that has a host output field mapped to a host input field (see host transaction B in FIG. 5). As previously mentioned, the host input field HAI-3 for host transaction A in FIG. 5 is mapped to the host output field HBO-1 of host transaction B. Therefore, host transaction B must have its host input fields 96 processed before host transaction A can be validated. Similar logic is used when determining which host transactions 90 can be submitted for processing on the host system 14 as will be described in FIG. 17.

The logic then proceeds to a decision block 268 where it determines whether the current mapped host input field 98 is the last mapped host input field in the given host transaction. If not, the logic proceeds to a block 270 to get the next mapped host input field 98. The logic then returns to decision block 262 and blocks 262–270 are repeated for each host input field. Returning to decision block 268, if the current mapped host input field is the last mapped host input field, the processing of the host input fields is complete and the logic ends in a block 271.

Figure 17:
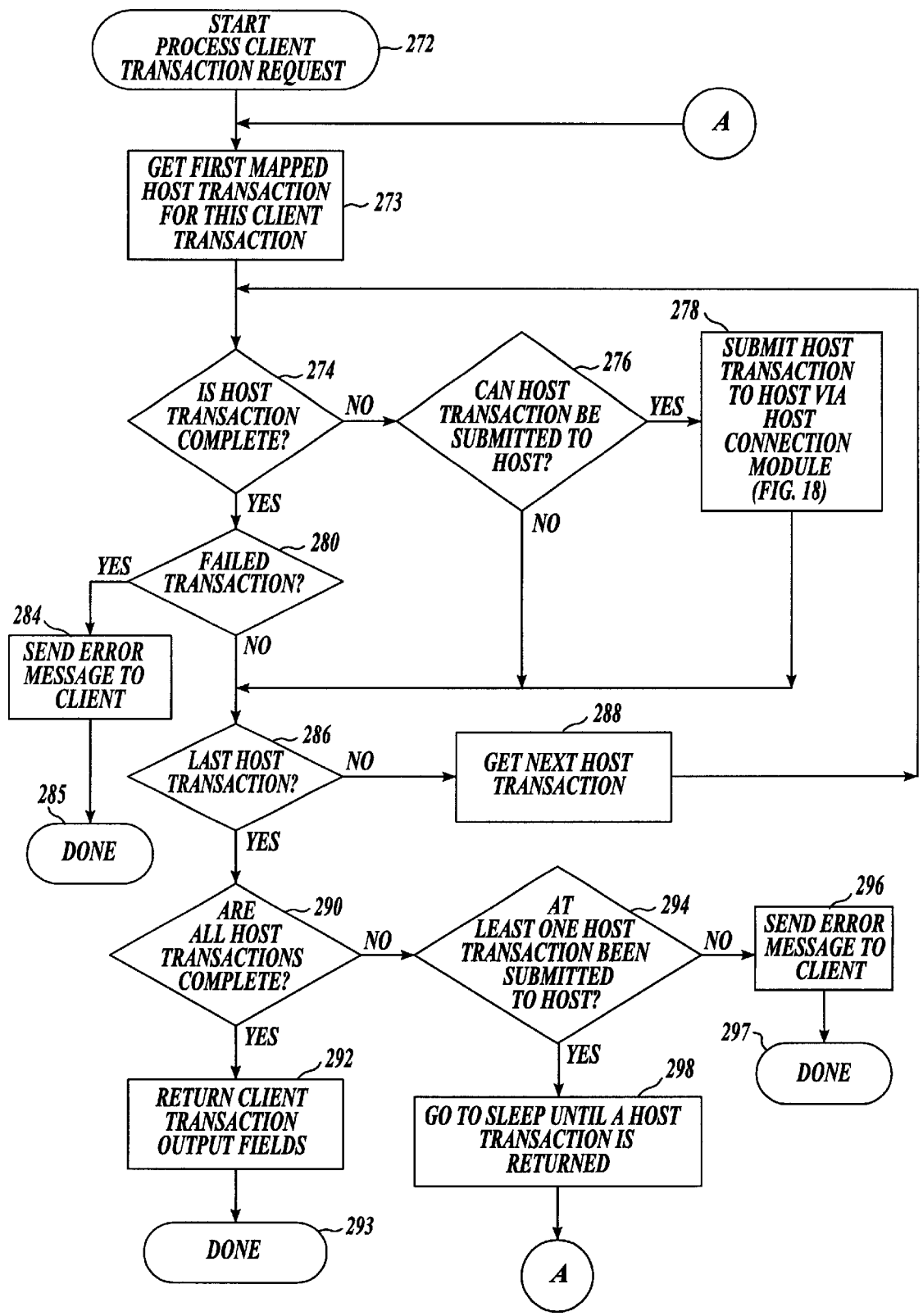
FIG. 17 is a flow diagram illustrating the logic used by the run-time transaction module to process client input fields in response to a client transaction request.

FIG. 17 is a flow diagram illustrating the logic used by the run-time transaction module 48 for processing client transaction requests as required in block 192 of FIG. 12 after the validation process described above is complete. As shown, the processing of client transactions 70 is a reiterative process. The present invention processes client transactions 70 concurrently so that multiple client transactions 70 may be in various stages of completeness. By allowing each client transaction 70 to map to multiple host transactions 90, the host transactions 90 may run on different host systems 14 with access to different information without the Web-based user of a client device 20 being aware of the coordination of transactions. The client device 20 needs to request only one transaction to get the desired results. Through each iteration of processing shown in FIG. 17, the client transaction 70 is reviewed to determine whether each dependent host transaction 90 has been completed by the host system 14. Once all the dependent host transactions 90 for a particular client transaction 70 have been completed, the client transaction output fields are returned to the client device 20.

Referring again to FIG. 5, in one iteration of the processing loop in FIG. 17, host transaction B is submitted to the host system 14. During a later iteration, the logic determines that host transaction B is completed and host transaction A must be submitted. The processing for each client transaction 70 is now described in more detail with reference to FIG. 17. As will be appreciated, each client transaction 70 is assigned to a working thread that processes that client transaction. The processing of client transactions is done a synchronously and is event driven. A client transaction may relinquish its working thread when waiting for an event so that other client transactions may use the same working thread. Therefore, the processing illustrated in FIG. 17 may be occurring simultaneously with other client transactions.

The logic begins in a block 272 and proceeds to a block 273 in which the first mapped host transaction 90 for the given client transaction is retrieved. The logic then proceeds to a decision block 274 where it is determined whether the first mapped host transaction 90 is complete, i.e., if it has been returned by the host system 14 containing the desired data. If not, the logic proceeds to a decision block 276 where it determines if the host transaction 90 can be submitted to the host system 14 for completion. A host transaction 90 may be submitted when all the host input fields are available and when there is a working thread available. If the answer is yes, the logic proceeds to block 278 where the host transaction 90 is submitted to the host system 14 via the host connection module 50. The submission of the host transaction is described in more detail below and in reference to FIG. 18. After the run-time transaction module 48 submits the host transaction to the host connection module 50, the logic proceeds to decision block 286 which will be described in a moment.

Returning to decision block 276, if the host transaction 90 cannot be submitted (i.e., because it is dependent on another host transaction) the logic again proceeds to decision block 286. Returning now to decision block 274, if the host transaction 90 is complete, the logic proceeds to decision block 280 where it determines if the transaction failed. If so, the logic proceeds to a decision block 284 where an error message is sent to the client device 20 requesting the client transaction. The logic then ends in a block 285.

At decision block 286, a decision is made whether the current host transaction 90 is the last host transaction for this client transaction. If not, the logic proceeds to a block 288 where the next host transaction 90 mapped to the current client transaction is retrieved. The logic then returns to decision block 274 and blocks 274–288 are repeated for each host transaction mapped to the current client transaction.

Returning to decision block 286, if the host transaction 90 is the last host transaction for the particular client transaction request, the logic proceeds to a decision block 290 where it determines if all the host transactions 90 for this particular client transaction request are complete, i.e., if all of the host transactions have been submitted to and returned by the host system 14 complete with the appropriate data If so, the logic proceeds to a block 292 where the data from the completed host output fields 98 desired by the client transaction (i.e., the data mapped to the client output fields 88) is returned to the client device 20 which made the client transaction request. The logic then ends in a block 293.

Returning to decision block 290, if there are still host transactions that need to be completed, i.e., submitted to and returned by the host system 14, the logic proceeds to a decision block 294. In decision block 294, the logic determines if at least one host transaction 90 mapped to the current client transaction 12 has been submitted to the host system 14. If not, the logic proceeds to block 296 where an error message is sent to the client device 20 and a block 297 where the logic ends Returning to decision block 294, if at least one dependent host transaction 90 has been submitted to the host system 14, the logic proceeds to a block 298 where processing enters a sleep state (i.e., relinquishing its working thread) until a previously submitted host transaction 90 is returned by the host system 14. Once a host transaction 90 is returned, the logic returns to block 272 and blocks 272–298 are repeated so as to reprocess the current client transaction 70 with the completed dependent host transaction 90. It will be appreciated that the logic of FIG. 17 will be repeated until each host transaction 90 mapped to the current client transaction is submitted to, completed by and returned by the host system (or until some error condition occurs). Further, it will be appreciated that each client transaction request uses the above logic concurrently with other client transaction requests.

Figure 18:
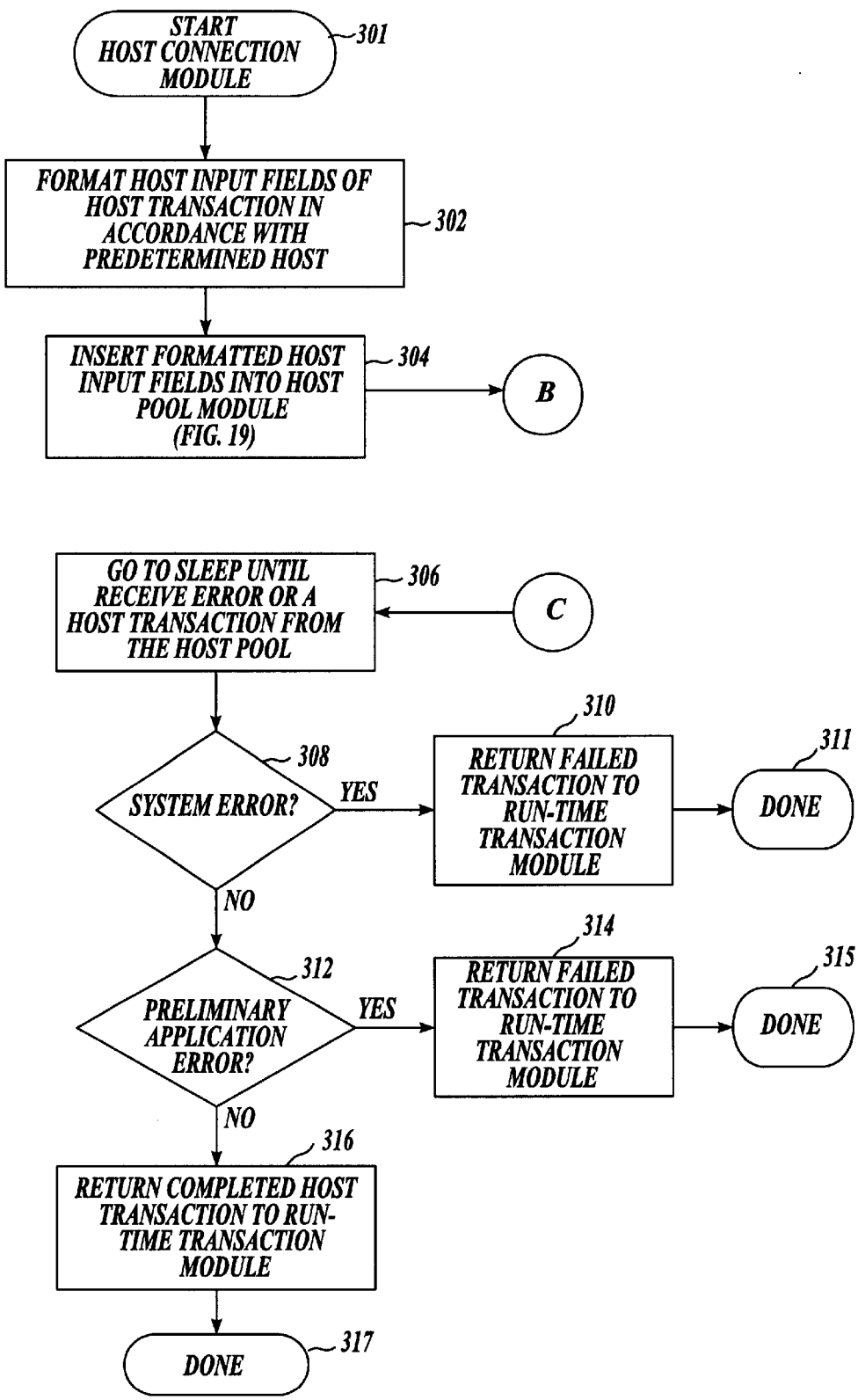
FIG. 18 is a flow diagram illustrating the logic used by the host connection module to submit host transactions to the host system via a host pool module.

FIG. 18 is a flow diagram illustrating the logic used by the host connection module 50 to submit host transactions 90 to the host system 14 as required in block 278 of FIG. 17. The logic begins in a block 301 and proceeds to a block 302 in which the host input fields 96 of the host transaction 90 are formatted in accordance with the requirements for the host system 14 as designated by the administrator during the configuration process in the new host transaction window 700. The logic then proceeds to a block 304 where the formatted host input fields 98 are inserted into a host pool queue for submission to the host system 14 during a session assigned to it by the host pool module 52. Processing of the host pool queue will be described in greater detail below and in reference to FIG. 19.

After the formatted host input fields 98 are inserted in the host pool queue for submission to the host system 14, the logic proceeds to a block 306 where the process enters a sleep state until an error or a completed host transaction is received from the host system 14 via the host pool module 52. Accordingly, in a decision block 308 the logic determines if there was a system error in submitting the host input fields 96 to the host system. A system error indicates that the connection to the host system 14 is not operational. If so, the failed transaction is returned to the run-time transaction module 48 in a block 310 and the logic ends in a block 311. The run-time transaction module then performs any clean-up operation and notifies the client device 20 accordingly (see blocks 280–284 in FIG. 17).

Returning to decision block 308, if there is not a system error, the logic proceeds to a decision block 312, where it determines if a preliminary application error has occurred. A preliminary application error occurs when the host system rejects a host transaction request. When this occurs, a failed transaction is returned to the run-time transaction module 48 (see blocks 280–284 in FIG. 17) and the logic for submitting the host transaction 90 then ends in a block 315. If the error is not a preliminary application error, the logic proceeds to block 316 where the completed host transaction 90 is returned to the run-time transaction module 48. After sending the host transaction to the run-time transaction module 48, the logic for submitting the host transaction ends in a block 317.

Figure 19:
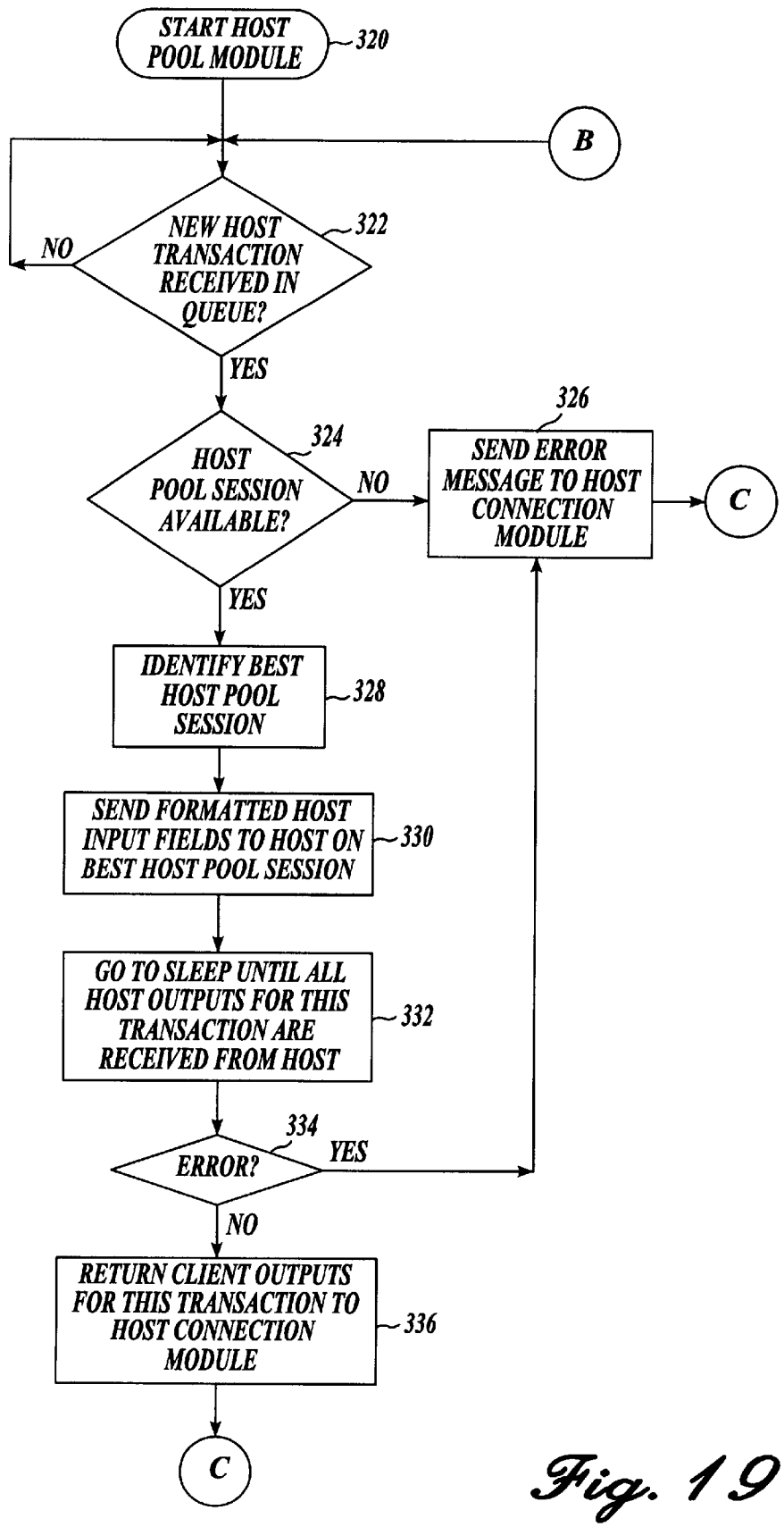
FIG. 19 is a flow diagram illustrating the logic used by the host pool module to submit host transactions to the host system.

FIG. 19 is a flow diagram illustrating the logic used for processing in the host pool module as required in block 304 of FIG. 18. Briefly, the host pool module 52 manages the host transactions 90 that need to be sent to the host systems 14 for completion. The host pool module 52 determines the session associated with the host transaction 90. In one embodiment, the host pool module 52 gathers statistics regarding the sessions to determine the best session to use to submit the host transaction 90. The logic of FIG. 19 begins in a block 320. In a decision block 322, a decision is made whether a new host transaction 90 is received in a queue of the host pool module 52. A new host transaction is received in the queue after the formatted host input fields are inserted into the host pool queue as shown at block 304 of FIG. 18. The logic proceeds to a decision block 324 where it determines if the specified host pool session is available. The host pool session is specified during configuration by the administrator. If the host pool session is not available, the logic proceeds to a block 326 where an error message is sent to the host connection module 50 of the direct transaction mapping program 38. The logic then returns to FIG. 18 at block 306.

Returning to decision block 324, if the host pool session is available, the logic proceeds to block 328 where the best host pool session is identified. The best host pool session is determined by measuring statistics on the sessions and counting the errors and failures occurring on each session. The session with the least amount of error and failures is considered the best session. The logic then proceeds to a block 330 where the formatted host input fields 96 are sent to the host system 14 on the best host pool session. The host pool queue then goes to sleep until a completed host transaction, i.e., until all of the host outputs, is received from the host system, as shown at block 332. The processing occurring on the host systems 14 to complete the host transaction 90 is well known in the art and will not be described in further detail herein. Upon receiving a completed host transaction 90 from the host system 14, the logic proceeds to decision block 334 where a decision is made whether there is an error. If so, the logic proceeds to block 326 where an error message is sent to the host connection module 50 as described above. If there was not an error, the logic proceeds to block 336 to return the completed host transaction to the host connection module.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A transaction server for providing a client device direct access to data residing on a host system, the transaction server comprising:
   a) a processing unit;
   b) a primary memory coupled to the processing unit, the primary memory storing instructions that control the execution of the instructions in the processing unit comprising:
      i) mapping a client transaction to one or more host transactions;
      ii) submitting the host transactions mapped to the client transaction to the host system for processing;
      iii) receiving data from the host system based on the submitted host transactions, the received data being stored within the submitted host transactions that have completed processing;
      iv) based on the received data, determining when the host system has completed processing for all the submitted host transactions; and
      v) storing a portion of the received data into the client transaction to which the one or more host transaction are mapped.

2. The transaction server of claim 1, wherein the client transaction is one of a plurality of client transactions.

3. The transaction server of claim 2, wherein submitting the host transactions mapped to the client transaction occurs concurrently with submitting other host transactions to the host system for processing, the other host transactions being mapped to another client transaction out of the plurality of client transactions.

4. The transaction server of claim 1, wherein the client transaction comprises one or more client output fields, and wherein each host transaction comprises one or more host input fields.

5. The transaction server of claim 4, wherein mapping the client transaction to one or more host transactions comprises:
   a) storing a first identifier in each of the one or more host input fields of each mapped host transaction, the first identifier associating a first data source for each of the one or more host input fields; and
   b) storing a second identifier in each of the one or more client output fields, wherein the second identifier for at least one of the client output fields associates at least one mapped host transaction with the client transaction.

6. The transaction server of claim 5, wherein the first identifier for at least one of the host input fields associates the client transaction with the mapped host transaction.

7. The transaction server of claim 4, wherein mapping the client transaction to one or more host transactions comprises dragging and dropping a first graphical representation representing a portion of the client transaction to a second graphical representation representing a portion of one of the host transactions.

8. The transaction server of claim 1, further comprising forwarding the portion of the received data in the client transaction to the client device.

9. A method for providing a client device with direct transaction access to data residing on a host system, the method comprising:
   a) mapping a client transaction to one or more host transactions;

b) submitting the host transactions mapped to the client transaction to the host system for processing;

c) receiving data from the host system based on the submitted host transactions, the received data being stored within the submitted host transactions that have completed processing;

d) based on the received data, determining when the host system has completed processing for all the submitted host transactions; and e) storing a portion of the received data in the client transaction to which the one or more host transaction are mapped.

10. The method of claim 9, wherein the client transaction is one of a plurality of client transactions.

11. The method of claim 10, wherein submitting the host transactions mapped to the client transaction occurs concurrently with submitting other host transactions to the host system for processing, the other host transactions being mapped to another client transaction out of the plurality of client transactions.

12. The method of claim 9, wherein the client transaction comprises one or more client output fields, and wherein each host transaction comprises one or more host input fields.

13. The method of claim 12, wherein mapping the client transaction to one or more host transactions comprises:

a) storing a first identifier in each of the one or more host input fields of each mapped host transaction, the first identifier associating a first data source for each of the one or more host input fields; and b) storing a second identifier in each of the one or more client output fields, wherein the second identifier for at least one of the client output fields associates at least one mapped host transaction with the client transaction.

14. The method of claim 13, wherein the first identifier for at least one of the host input fields associates the client transaction with the mapped host transaction.

15. The method of claim 13, further comprising a) resolving each first identifier into a first addressable reference that points to the first data source at which a content of the first data source is retrieved for storing into the associated host input field before submitting the host transaction; and b) resolving each second identifier into a second addressable reference that points to a second data source where the portion of the retrieved data is stored.

16. The method of claim 15, wherein the first data source includes a static variable.

17. The method of claim 15, wherein the host transaction further comprises one or more host output fields and wherein the first data source includes one of the host output fields of another host transaction.

18. The method of claim 15, wherein the client transaction further comprises one or more client input fields and wherein the first data source includes one of the client input fields.

19. The method of claim 15, wherein the host transaction further comprises one or more host output fields and wherein the second data source includes one of the host output fields of the mapped host transaction.

20. The method of claim 15, wherein the host transaction further comprises one or more host output fields and wherein the second data source includes one of the host output fields of another host transaction.

21. The method of claim 12, wherein mapping the client transaction to one or more host transactions comprises dragging and dropping a first graphical representation representing a portion of the client transaction to a second graphical representation representing a portion of one of the host transactions.

22. The method of claim 9, further comprising forwarding the portion of the received data in the client transaction to the client device.

23. A computer-readable medium having computer executable components for providing a client device with direct transaction access to data residing on a host system, the computer-readable medium having computer-executable components comprising:

a) a configuration module for mapping a client transaction to one or more host transactions; and b) a run-time transaction module for submitting the host transactions mapped to the client transaction to the host system to retrieve the data requested by the client transaction, and storing a portion of the retrieved data into the client transaction to which the host transactions are mapped.

24. The computer-readable medium of claim 23, wherein the client transaction is one of a plurality of client transactions and wherein the run-time transaction module submits the host transactions mapped to the client transaction concurrently with submitting other host transactions to the host system for processing, the other host transactions being mapped to another client transaction out of the plurality of client transactions.

25. The computer-readable medium of claim 23, wherein the client transaction comprises one or more client output fields, and wherein each host transaction comprises one or more host input fields.

26. The computer-readable medium of claim 25, wherein the configuration module maps the client transaction to one or more host transactions by:

a) storing a first identifier in each of the one or more host input fields of each mapped host transaction, the first identifier associating a first data source for each of the one or more host input fields; and b) storing a second identifier in each of the one or more client output fields, wherein the second identifier for at least one of the client output fields associates at least one mapped host transaction with the client transaction.

27. The computer-readable medium of claim 26, wherein the run-time transaction module submits the host transaction mapped to the client transaction by:

a) resolving each first identifier into a first addressable reference that points to the first data source at which a content of the first data source is retrieved for storing into the host input field before submitting the host transaction; and b) resolving each second identifier into a second addressable reference that points to a second data source where the portion of the retrieved data is stored.

28. The computer-readable medium of claim 27, wherein the first data source includes a static variable.

29. The computer-readable medium of claim 27, wherein each host transaction further comprises one or more host output fields and wherein the first data source of the host transaction includes one of the host output fields of another host transaction.

30. The computer-readable medium of claim 27, wherein the client transaction further comprises one or more client input fields and wherein the first data source includes one of the client input fields.

31. The computer-readable medium of claim 27, wherein each host transaction further comprises one or more host output fields and wherein the second data source includes one of the host output fields of the mapped host transaction.

32. The computer-readable medium of claim 27, wherein each host transaction further comprises one or more host output fields and wherein the second data source includes one of the host output fields of another host transaction.

33. The computer-readable medium of claim 25, further comprising a graphical user interface module for allowing a user to drag and drop a first graphical representation representing a portion of the client transaction to a second graphical representation representing a portion of one of the host transactions thereby mapping the client transaction to the one or more host transactions.

34. The computer-readable medium of claim 23, wherein the configuration module further stores the at least one mapped host transaction and the client transaction to a configuration database.

35. The computer-readable medium of claim 23, further comprising a client connection module for forwarding the portion of the received data in the client transaction to the client device.

* * * * *